(12) United States Patent
Dankel et al.

(10) Patent No.: US 7,536,682 B2
(45) Date of Patent: May 19, 2009

(54) METHOD AND APPARATUS FOR PERFORMING INTERPRETER OPTIMIZATIONS DURING PROGRAM CODE CONVERSION

(75) Inventors: Gisle Dankel, Manchester (GB); Gavin Barraclough, Manchester (GB); Matthew L. Evans, Manchester (GB)

(73) Assignee: International Business Machines Corporation, Armonk, NY (US)

( * ) Notice: Subject to any disclaimer, the term of this patent is extended or adjusted under 35 U.S.C. 154(b) by 344 days.

(21) Appl. No.: 10/732,764

(22) Filed: Dec. 10, 2003

(65) Prior Publication Data

US 2004/0221278 A1    Nov. 4, 2004

(30) Foreign Application Priority Data

| Apr. 22, 2003 | (GB) | ................................. 0309056.0 |
| Jun. 30, 2003 | (GB) | ................................. 0315164.4 |
| Sep. 4, 2003 | (GB) | ................................. 0320716.4 |

(51) Int. Cl.
  G06F 9/45 (2006.01)
(52) U.S. Cl. .................. 717/139; 717/140; 717/141; 712/209
(58) Field of Classification Search ................. 717/139, 717/140, 141; 712/208, 209
  See application file for complete search history.

(56) References Cited

U.S. PATENT DOCUMENTS

| 5,652,889 A | 7/1997 | Sites |
| 5,751,982 A | 5/1998 | Morley |
| 5,768,593 A | 6/1998 | Walters et al. |
| 5,828,884 A | 10/1998 | Halligan et al. |
| 5,842,017 A | 11/1998 | Hookway et al. |
| 5,867,690 A | 2/1999 | Lee et al. |
| 5,966,539 A | 10/1999 | Srivastava |

(Continued)

FOREIGN PATENT DOCUMENTS

EP    0 908 819 A2    4/1999

(Continued)

OTHER PUBLICATIONS

Altman et al, IBM Research Report, "BOA: The Architecture of a Binary Translation Processor", Dec; 16, 1999.*

(Continued)

*Primary Examiner*—Tuan Q Dam
*Assistant Examiner*—Zheng Wei
(74) *Attorney, Agent, or Firm*—WilmerHale, LLP; Matthew B. Talpis

(57) ABSTRACT

A translator apparatus is provided with both program code interpreting and translating functionality, where subject program code is interpreted rather than being translated in those situations where interpretation of the subject program code is determined to be more beneficial. The translator applies an interpreting algorithm to determine whether a basic block of subject program code should be interpreted or translated. A particular subject of instructions supported by the interpreter functionality is initially selected from an entire instruction set for the subject program code. A basic block will be interpreted 1) if all of the instructions within a basic block are determined to be within the subset of instructions supported by the interpreter functionality, and 2) if an execution count of the basic block is below a translation threshold. If either of these two conditions are not satisfied, then the basic block is translated by the translator

25 Claims, 17 Drawing Sheets

U.S. PATENT DOCUMENTS

| | | | |
|---|---|---|---|
| 5,970,236 | A | 10/1999 | Galloway et al. |
| 6,002,879 | A | 12/1999 | Radigan et al. |
| 6,021,275 | A | 2/2000 | Horwat |
| 6,085,203 | A | 7/2000 | Ahlers et al. |
| 6,099,585 | A * | 8/2000 | Godfrey ............... 717/154 |
| 6,189,141 | B1 | 2/2001 | Benitez et al. |
| 6,237,141 | B1 * | 5/2001 | Holzle et al. .......... 717/153 |
| 6,345,384 | B1 * | 2/2002 | Sato ................... 717/160 |
| 6,484,188 | B1 | 11/2002 | Kwong et al. |
| 6,535,903 | B2 | 3/2003 | Yates et al. |
| 6,880,152 | B1 * | 4/2005 | Torvalds et al. ....... 717/138 |
| 7,200,841 | B2 | 4/2007 | Lovett et al. |
| 2001/0042172 | A1 | 11/2001 | Duesterwald et al. |
| 2004/0154009 | A1 | 8/2004 | Reynaud |
| 2004/0221278 | A1 | 11/2004 | Dankel et al. |
| 2004/0221280 | A1 | 11/2004 | Bolton et al. |
| 2004/0255279 | A1 | 12/2004 | Rawsthorne et al. |
| 2005/0010891 | A1 | 1/2005 | Chaiken et al. |

FOREIGN PATENT DOCUMENTS

| | | | |
|---|---|---|---|
| GB | 2 367 652 | A | 4/2002 |
| WO | PCT/US00/24649 | | 4/2001 |
| WO | WO 2001/027751 | A1 | 4/2001 |

OTHER PUBLICATIONS

Erik et al, "Welcome to the opportunities of binary translation", pp. 54-49, 2000, IEEE.*

Ebcioglu et al., "Dynamic Binary Translation and Optimization", IEEE, Transactions on computers. vol. 50, No. 6, Jun. 2001, pp. 529-548.*

Vasantha Bala, Evelyn Duesterwald & Sanjeev Banerjia, *Dynamo: A Transparent Dynamic Optimization System*; PLDI 2000, pp. 1-12.

M. Anton Ertl, *A Portable Forth Engine*, In EuroForth 1993 Conference Proceedings, pp. 1-5.

Sun Microsystems, *The Java Hotspot™ Virtual Machine*, v1.4.1, d2, Sep. 2002.

Proceedings of the Ninth Conference on Reverse Engineering, Oct. 29- Nov. 1, 2002, Torger and Cifuentes, "Analysis of virtual method invocation for binary translation" pp. 65-74.

Aho. Compilers: Principles, Techniques and Tools. pp. 463-473, 554-555 and 585-595.

Chung et al. "Performance Implication of Design Alternatives for Remote Procedure Call Stubs.".

Gupta et al. "Path Profile Guided Partial Dead Code Elimination Using Predication.".

Takimoto et al. "Partial Dead Code Elimination Using Extended Value Graph.".

Search Report from United Kingdom, Patent Application No. GB0320718.0 dated Feb. 24, 2004.

Search Report from United Kingdom, Patent Application No. GB0322323.7 dated Mar. 11, 2004.

www.ardi.com/SysPaper/node5.html "Native code", 4 pages.

Search Report from United Kingdom Patent Application No. PCT/GB2004/001744 dated Nov. 10, 2004.

Search Report from United Kingdom Patent Application No. PCT/GB2004/001722 dated Jan. 26, 2005.

Mathew J. Hostetter, Clifford T. Matthews, "Executor Internals: How to Efficiently Run Mac Programs on PCs" 'Online! 1996, XP002300303 Retreived from the Internet: URL:http://www.ardi.com/MacHack_96.html> 'retreived on Oct. 12, 2004! p. 3, paragraph 4- paragraph 6.

"Program of MacHack '96 (confirming the publication date of document D1) "'Online! XP002300340, Retrieved from the Internet: URL:www.machack.com/96/Sessions.html> 'retrieved on Oct. 12, 2004.

Palaniswamy A C et al: "An efficient implementation of lazy reevaluation" Proceedings. 25th Annual Simulation symposium (Cat. No. 92TG0433-3) IEEE Comput. Soc. Press Los Alamitos, CA, USA, 1992, pp. 140-146, XP010028446, ISBN: O-8186-2765-4.

David Ung and Cristina Cifuentes: "Machine-Adaptable Dynamic Binary Translation" Proceedings of the ACM Sigplan Workshop on Dynamic and Adaptive Compilations and Optimiation, XX, XX, Jan. 2000 (Jan. 2000), pp. 41-51, XP002279759.

Cifuentes C et al: The design of a resourceable and retargetable binary translator: Reverse Engineering, 1999 Proceedings. Sixth Working Conference on Atlanta, GA, USA Oct. 6-8, 1999, Los Alamitos, CA, USA, IEEE Comput. Soc, US Oct. 6, 1999 (Oct. 6, 1999), pp. 280-291, XP010360228, ISBN: 0-7695-0303-9.

Knoop J et al; "Partial Dead Code Elimination" ACM Sigplan Notices, Association for Computing Machinery, New York, US, vol. 29, No. 6, Jun. 1994, pp. 147-158, XP000450413, ISSN: 0362-1340.

* cited by examiner

Subject Code                                     200

```
LABEL1   r3 := LOAD(r2 + 24)
         r1 := r1 -1
         CMP r1 0
         BC LABEL1
         STORE 16(r5) r3
```

Group Block

Block 1 IR Without Lazy Byteswapping

Block 2 IR Without Lazy Byteswapping

Block 2 IR With Lazy Byteswapping

METHOD AND APPARATUS FOR PERFORMING INTERPRETER OPTIMIZATIONS DURING PROGRAM CODE CONVERSION

BACKGROUND

1. Technical Field

The subject invention relates generally to the field of computers and computer software and, more particularly, to program code conversion methods and apparatus useful, for example, in code translators, emulators and accelerators.

2. Description of Related Art

In both embedded and non-embedded CPU's, one finds predominant Instruction Set Architectures (ISAs) for which large bodies of software exist that could be "accelerated" for performance, or "translated" to a myriad of capable processors that could present better cost/performance benefits, provided that they could transparently access the relevant software. One also finds dominant CPU architectures that are locked in time to their ISA, and cannot evolve in performance or market reach. Such architectures would benefit from "Synthetic CPU" co-architecture.

Program code conversion methods and apparatus facilitate such acceleration, translation and co-architecture capabilities and are addressed, for example, in the co-pending patent application entitled Program Code Conversion, U.S. application Ser. No. 09/827,971.

SUMMARY

The following is a summary of various aspects and advantages realizable according to various embodiments according to the invention. It is provided as an introduction to assist those skilled in the art to more rapidly assimilate the detailed design discussion that ensues and does not and is not intended in any way to limit the scope of the claims that are appended hereto.

In particular, the inventors have developed a number of optimization techniques directed at expediting program code conversion, particularly useful in connection with a run-time translator which employs translation of successive basic blocks of subject program code into target code wherein the target code corresponding to a first basic block is executed prior to generation of target code for the next basic block.

In one such optimization, the translator is provided with both program code interpreting and translating functionality, where subject program code is interpreted rather than being translated in those situations where interpretation of the subject program code is determined to be more beneficial. The translator applies an interpreting algorithm to determine whether a basic block of subject program code should be interpreted or translated. A particular subject of instructions supported by the interpreter functionality is initially selected from an entire instruction set for the subject program code. A basic block will be interpreted 1) if all of the instructions within a basic block are determined to be within the subset of instructions supported by the interpreter functionality, and 2) if an execution count of the basic block is below a translation threshold. If either of these two conditions are not satisfied, then the basic block is translated by the translator.

BRIEF DESCRIPTION OF THE DRAWINGS

The accompanying drawings, which are incorporated in and constitute a part of the specification, illustrate presently preferred implementations and are described as follows.

DETAILED DESCRIPTION

Figure 1:
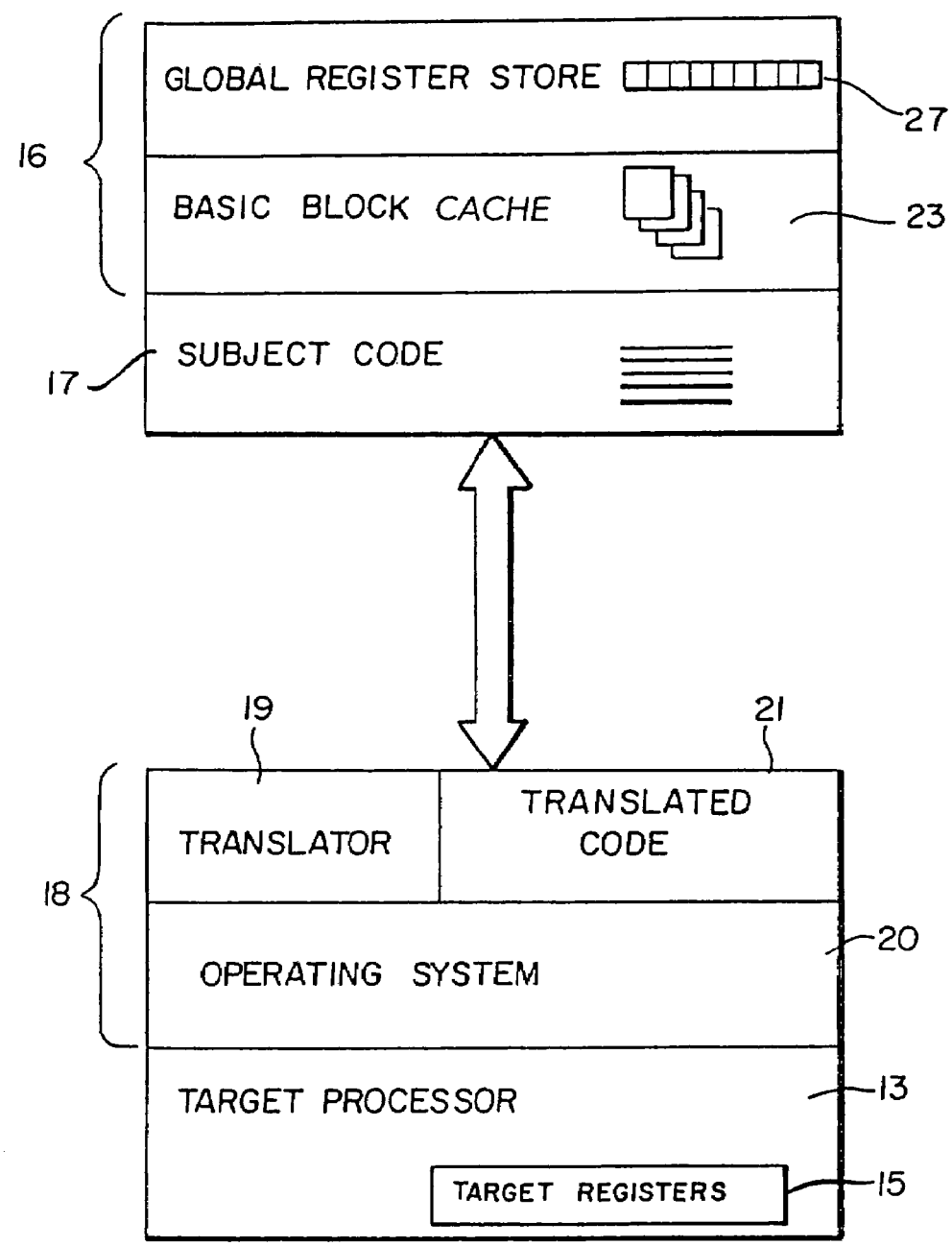
FIG. 1 is a block diagram of apparatus wherein embodiments of the invention find application.

Illustrative apparatus for implementing various novel features discussed below is shown in FIG. 1. FIG. 1 illustrates a target processor 13 including target registers 15 together with memory 18 storing a number of software components 19, 20, 21, and providing working storage 16 including a basic block cache 23, a global register store 27, and the subject code 17 to be translated. The software components include an operating system 20, the translator code 19, and translated code 21. The translator code 19 may function, for example, as an emulator translating subject code of one ISA into translated code of another ISA or as an accelerator for translating subject code into translated code, each of the same ISA.

The translator 19, i.e., the compiled version of the source code implementing the translator, and the translated code 21, i.e., the translation of the subject code 17 produced by the translator 19, run in conjunction with the operating system 20 such as, for example, UNIX running on the target processor 13, typically a microprocessor or other suitable computer. It will be appreciated that the structure illustrated in FIG. 1 is exemplary only and that, for example, software, methods and processes according to the invention may be implemented in code residing within or beneath an operating system. The subject code, translator code, operating system, and storage mechanisms may be any of a wide variety of types, as known to those skilled in the art.

In apparatus according to FIG. 1, program code conversion is preferably performed dynamically, at run-time, while the translated code 21 is running. The translator 19 runs inline with the translated program 21. The execution path of the translation process is a control loop comprising the steps of: executing translator code 19, which translates a block of the subject code 17 into translated code 21, and then executing that block of translated code; the end of each block of translated code contains instructions to return control back to the translator code 19. In other words, the steps of translating and then executing the subject code are interlaced, such that only portions of the subject program 17 are translated at a time and the translated code of a first basic block is executed prior to the translation of subsequent basic blocks. The translator's fundamental unit of translation is the basic block, meaning that the translator 19 translates the subject code 17 one basic block at a time. A basic block is formally defined as a section of code with exactly one entry point and exactly one exit point, which limits the block code to a single control path. For this reason, basic blocks are the fundamental unit of control flow.

In the process of generating the translated code 21, intermediate representation ("IR") trees are generated based on the subject instruction sequence. IR trees are abstract representations of the expressions calculated and operations performed by the subject program. Later, translated code 21 is generated based on the IR trees.

The collections of IR nodes described herein are colloquially referred to as "trees". We note that, formally, such structures are in fact directed acyclic graphs (DAGs), not trees. The formal definition of a tree requires that each node have at most one parent. Because the embodiments described use common subexpression elimination during IR generation, nodes will often have multiple parents. For example, the IR of a flag-affecting instruction result may be referred to by two abstract registers, those corresponding to the destination subject register and the flag result parameter.

For example, the subject instruction "add %r1, %r2, %r3" performs the addition of the contents of subject registers %r2 and %r3 and stores the result in subject register %r1. Thus, this instruction corresponds to the abstract expression "%r1=%r2+%r3". This example contains a definition of the abstract register %r1 with an add expression containing two subexpressions representing the instruction operands %r2 and %r3. In the context of a subject program 17, these subexpressions may correspond to other, prior subject instructions, or they may represent details of the current instruction such as immediate constant values.

Figure 2:
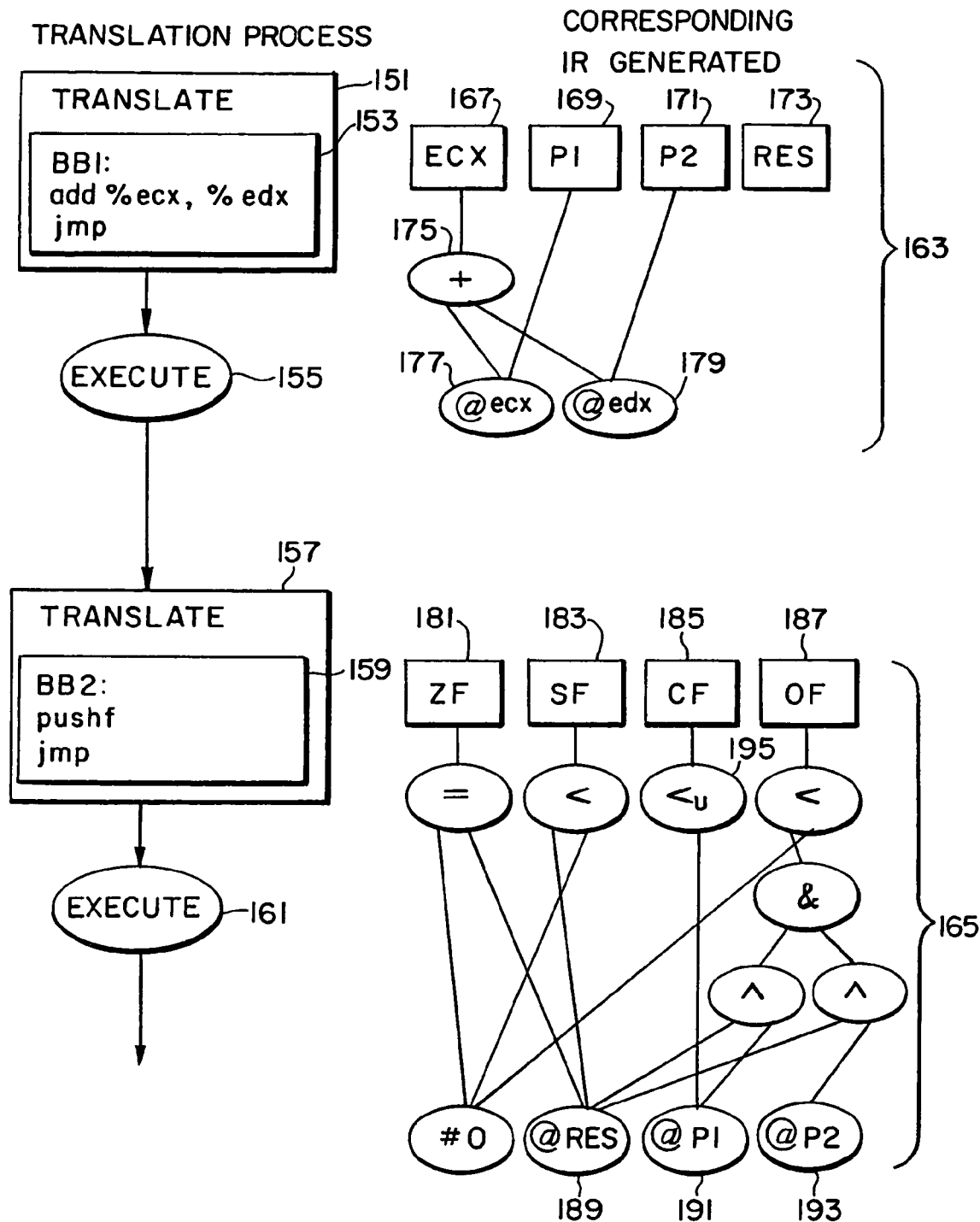
FIG. 2 is a schematic diagram illustrating a run-time translation process and corresponding IR (intermediate representation) generated during the process.

When the "add" instruction is parsed, a new "+" IR node is generated, corresponding to the abstract mathematical operator for addition. The "+" IR node stores references to other IR nodes that represent the operands (represented in the IR as subexpression trees, often held in subject registers). The "+" node is itself referenced by the subject register whose value it defines (the abstract register for %r1, the instruction's destination register). For example, the center-right portion of FIG. 2 shows the IR tree corresponding to the X86 instruction "add %ecx, %edx".

As those skilled in the art may appreciate, in one embodiment the translator 19 is implemented using an object-oriented programming language such as C++. For example, an IR node is implemented as a C++ object, and references to other nodes are implemented as C++ references to the C++ objects corresponding to those other nodes. An IR tree is therefore implemented as a collection of IR node objects, containing various references to each other.

Further, in the embodiment under discussion, IR generation uses a set of abstract registers. These abstract registers correspond to specific features of the subject architecture. For example, there is a unique abstract register for each physical register on the subject architecture ("subject register"). Similarly, there is a unique abstract register for each condition code flag present on the subject architecture. Abstract registers serve as placeholders for IR trees during IR generation. For example, the value of subject register %r2 at a given point in the subject instruction sequence is represented by a particular IR expression tree, which is associated with the abstract register for subject register %r2. In one embodiment, an abstract register is implemented as a C++ object, which is associated with a particular IR tree via a C++ reference to the root node object of that tree.

In the example instruction sequence described above, the translator has already generated IR trees corresponding to the values of %r2 and %r3 while parsing the subject instructions that precede the "add" instruction. In other words, the subexpressions that calculate the values of %r2 and %r3 are already represented as IR trees. When generating the IR tree for the "add %r1, %r2, %r3" instruction, the new "+" node contains references to the IR subtrees for %r2 and %r3.

The implementation of the abstract registers is divided between components in both the translator code 19 and the translated code 21. Within the translator 19, an "abstract register" is a placeholder used in the course of IR generation, such that the abstract register is associated with the IR tree that calculates the value of the subject register to which the particular abstract register corresponds. As such, abstract registers in the translator may be implemented as a C++ object which contains a reference to an IR node object (i.e., an IR tree). The aggregate of all IR trees referred to by the abstract register set is referred to as the working IR forest ("forest" because it contains multiple abstract register roots, each of which refers to an IR tree). The working IR forest represents a snapshot of the abstract operations of the subject program at a particular point in the subject code.

Within the translated code 21, an "abstract register" is a specific location within the global register store, to and from which subject register values are synchronized with the actual target registers. Alternatively, when a value has been loaded from the global register store, an abstract register in the translated code 21 could be understood to be a target register 15, which temporarily holds a subject register value during the execution of the translated code 21, prior to being saved back to the register store.

An example of program translation as described above is illustrated in FIG. 2. FIG. 2 shows the translation of two basic blocks of X86 instructions, and the corresponding IR trees that are generated in the process of translation. The left side of FIG. 2 shows the execution path of the translator 19 during translation. In step 151, the translator 19 translates a first basic block 153 of subject code into target code 21 and then, in step 155, executes that target code 21. When the target code 21 finishes execution, control is returned to the translator 19, step 157, wherein the translator translates the next basic block 159 of subject code 17 into target code 21 and then executes that target code 21, step 161, and so on.

In the course of translating the first basic block 153 of subject code into target code, the translator 19 generates an IR tree 163 based on that basic block 153. In this case, the IR tree 163 is generated from the source instruction "add %ecx, %edx," which is a flag-affecting instruction. In the course of generating the IR tree 163, four abstract registers are defined by this instruction: the destination abstract register %ecx 167, the first flag-affecting instruction parameter 169, the second flag-affecting instruction parameter 171, and the flag-affecting instruction result 173. The IR tree corresponding to the "add" instruction is a "+" operator 175 (i.e., arithmetic addition), whose operands are the subject registers %ecx 177 and %edx 179.

Thus, emulation of the first basic block 153 puts the flags in a pending state by storing the parameters and result of the flag-affecting instruction. The flag-affecting instruction is "add %ecx, %edx." The parameters of the instruction are the current values of emulated subject registers %ecx 177 and %edx 179. The "@" symbol preceding the subject register uses 177, 179 indicate that the values of the subject registers are retrieved from the global register store, from the locations corresponding to %ecx and %edx, respectively, as these particular subject registers were not previously loaded by the current basic block. These parameter values are then stored in the first and second flag parameter abstract registers 169, 171. The result of the addition operation 175 is stored in the flag result abstract register 173.

After the IR tree is generated, the corresponding target code 21 is generated based on the IR. The process of generating target code 21 from a generic IR is well understood in the art. Target code is inserted at the end of the translated block to save the abstract registers, including those for the flag result 173 and the flag parameters 169, 171, to the global register store 27. After the target code is generated, it is then executed, step 155.

FIG. 2 shows an example of translation and execution interlaced. The translator 19 first generates translated code 21 based on the subject instructions 17 of a first basic block 153, then the translated code for basic block 153 is executed. At the end of the first basic block 153, the translated code 21 returns control to the translator 19, which then translates a second basic block 159. The translated code 21 for the second basic block 161 is then executed. At the end of the execution of the second basic block 159, the translated code returns control to the translator 19, which then translates the next basic block, and so forth.

Thus, a subject program running under the translator 19 has two different types of code that execute in an interleaved manner: the translator code 19 and the translated code 21. The translator code 19 is generated by a compiler, prior to run-time, based on the high-level source code implementation of the translator 19. The translated code 21 is generated by the translator code 19, throughout run-time, based on the subject code 17 of the program being translated.

The representation of the subject processor state is likewise divided between the translator 19 and translated code 21 components. The translator 19 stores subject processor state in a variety of explicit programming language devices such as variables and/or objects; the compiler used to compile the translator determines how the state and operations are implemented in target code. The translated code 21, by comparison, stores subject processor state implicitly in target registers and memory locations, which are manipulated directly by the target instructions of the translated code 21.

For example, the low-level representation of the global register store 27 is simply a region of allocated memory. This is how the translated code 21 sees and interacts with the abstract registers, by saving and restoring between the defined memory region and various target registers. In the source code of the translator 19, however, the global register store 27 is a data array or an object which can be accessed and manipulated at a higher level. With respect to the translated code 21, there simply is no high-level representation.

In some cases, subject processor state which is static or statically determinable in the translator 19 is encoded directly into the translated code 21 rather than being calculated dynamically. For example, the translator 19 may generate translated code 21 that is specialized on the instruction type of the last flag-affecting instruction, meaning that the translator would generate different target code for the same basic block if the instruction type of the last flag-affecting instruction changed.

Figure 3:
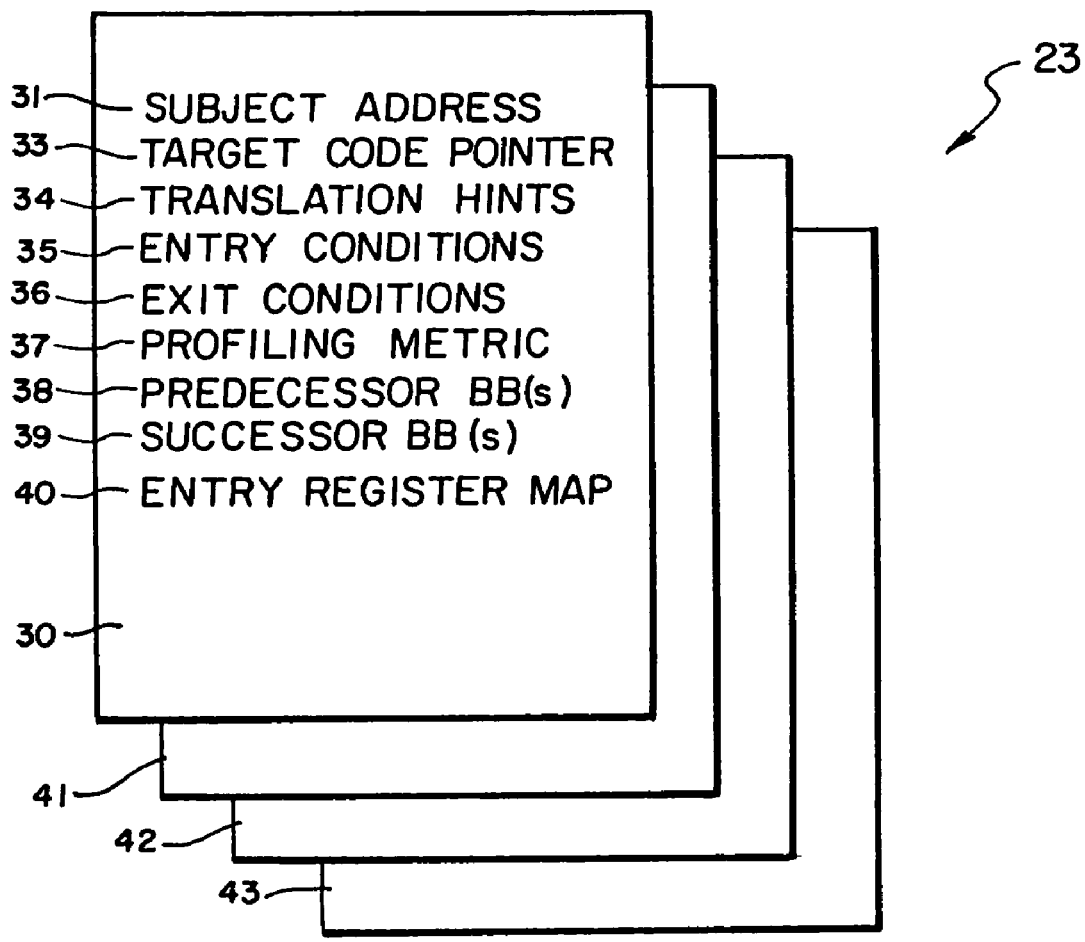
FIG. 3 is a schematic illustrating a basic block data structure and cache according to an illustrative embodiment of the invention.

The translator 19 contains data structures corresponding to each basic block translation, which particularly facilitates extended basic block, isoblock, group block, and cached translation state optimizations as hereafter described. FIG. 3 illustrates such a basic block data structure 30, which includes a subject address 31, a target code pointer 33 (i.e., the target address of the translated code), translation hints 34, entry and exit conditions 35, a profiling metric 37, references to the data structures of the predecessor and successor basic blocks 38, 39, and an entry register map 40. FIG. 3 further illustrates the basic block cache 23, which is a collection of basic block data structures, e.g., 30, 41, 42, 43, 44 . . . indexed by subject address. In one embodiment, the data corresponding to a particular translated basic block may be stored in a C++ object. The translator creates a new basic block object as the basic block is translated.

The subject address 31 of the basic block is the starting address of that basic block in the memory space of the subject program 17, meaning the memory location where the basic block would be located if the subject program 17 were running on the subject architecture. This is also referred to as the subject starting address. While each basic block corresponds to a range of subject addresses (one for each subject instruction), the subject starting address is the subject address of the first instruction in the basic block.

The target address 33 of the basic block is the memory location (starting address) of the translated code 21 in the target program. The target address 33 is also referred to as the target code pointer, or the target starting address. To execute a translated block, the translator 19 treats the target address as a function pointer which is dereferenced to invoke (transfer control to) the translated code.

The basic block data structures 30, 41, 42, 43, . . . are stored in the basic block cache 23, which is a repository of basic block objects organized by subject address. When the translated code of a basic block finishes executing, it returns control to the translator 19 and also returns the value of the basic block's destination (successor) subject address 31 to the translator. To determine if the successor basic block has already been translated, the translator 19 compares the destination subject address 31 against the subject addresses 31 of basic blocks in the basic block cache 23 (i.e., those that have already been translated). Basic blocks which have not been yet translated are translated and then executed. Basic blocks which have already been translated (and which have compatible entry conditions, as discussed below) are simply executed. Over time, many of the basic blocks encountered will already have been translated, which causes the incremental translation cost to decrease. As such, the translator 19 gets faster over time, as fewer and fewer blocks require translation.

Extended Basic Blocks

One optimization applied according to the illustrative embodiment is to increase the scope of code generation by a technique referred to as "extended basic blocks." In cases where a basic block A has only one successor block (e.g., basic block B), the translator may be able to statically determine (when A is decoded) the subject address of B. In such cases, basic blocks A and B are combined into a single block (A') which is referred to as an extended basic block. Put differently, the extended basic block mechanism can be applied to unconditional jumps whose destination is statically determinable; if a jump is conditional or if the destination cannot be statically determined, then a separate basic block must be formed. An extended basic block may still formally be a basic block, because after the intervening jump from A to B is removed, the code of block A' has only a single flow of control, and therefore no synchronization is necessary at the AB boundary.

Even if A has multiple possible successors including B, extended basic blocks may be used to extend A into B for a particular execution in which B is the actual successor and B's address is statically determinable.

Statically determinable addresses are those the translator can determine at decode-time. During construction of a block's IR forest, an IR tree is constructed for the destination subject address, which is associated with the destination address abstract register. If the value of destination address IR tree is statically determinable (i.e., does not depend on dynamic or run-time subject register values), then the successor block is statically determinable. For example, in the case of an unconditional jump instruction, the destination address (i.e., the subject starting address of the successor block) is implicit in the jump instruction itself; the subject address of the jump instruction plus the offset encoded in the jump instruction equals the destination address. Likewise, the optimizations of constant folding (e.g., X+(2+3)=>X+5) and expression folding (e.g., (X*5)*10=>X*50) may cause an otherwise "dynamic" destination address to become statically determinable. The calculation of the destination address thus consists of extracting the constant value from the destination address IR.

When extended basic block A' is created, the translator subsequently treats it the same as any other basic block when performing IR generation, optimizations, and code generation. Because the code generation algorithms are operating on a larger scope (i.e., the code of basic blocks A and B combined), the translator 19 generates more optimal code.

As one of ordinary skill in the art will appreciate, decoding is the process of extracting individual subject instructions from the subject code. The subject code is stored as an unformatted byte stream (i.e., a collection of bytes in memory). In the case of subject architectures with variable-length instructions (e.g., X86), decoding first requires the identification of instruction boundaries; in the case of fixed-length instruction architectures, identifying instruction boundaries is trivial (e.g., on the MIPS, every four bytes is an instruction). The subject instruction format is then applied to the bytes that constitute a given instruction to extract the instruction data (i.e., the instruction type, operand register numbers, immediate field values, and any other information encoded in the instruction). The process of decoding machine instructions of a known architecture from an unformatted byte stream using that architecture's instruction format is well understood in the art.

Figure 4:
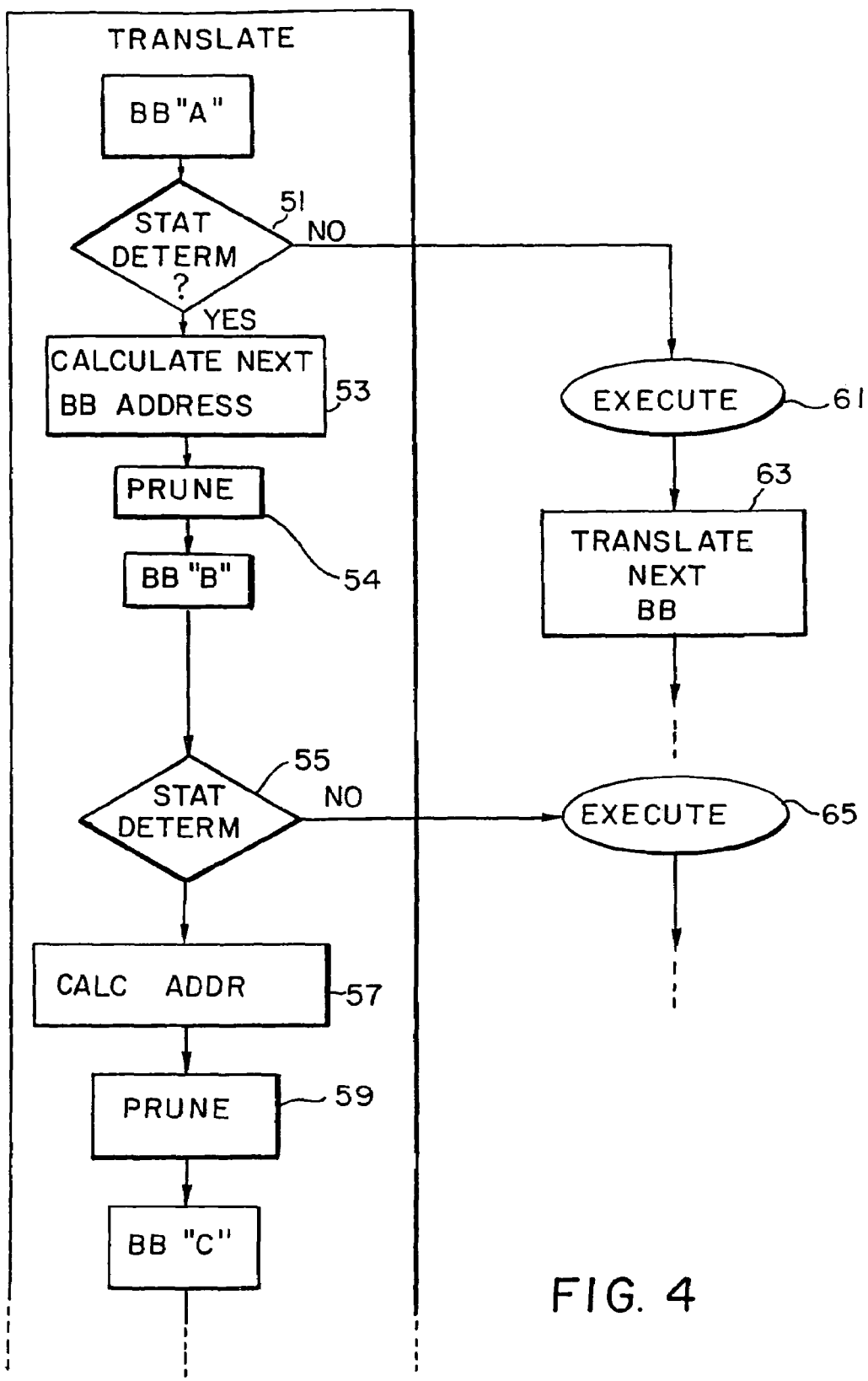
FIG. 4 is a flow diagram illustrating an extended basic block process.

FIG. 4 illustrates the creation of an extended basic block. A set of constituent basic blocks which is eligible to become an extended basic block is detected when the earliest eligible basic block (A) is decoded. If the translator 19 detects that A's successor (B) is statically determinable 51, it calculates B's starting address 53 and then resumes the decoding process at the starting address of B. If B's successor (C) is determined to be statically determinable 55, the decoding process proceeds to the starting address of C, and so forth. Of course, if a successor block is not statically determinable then normal translation and execution resume 61, 63, 65.

During all basic block decoding, the working IR forest includes an IR tree to calculate the subject address 31 of the current block's successor (i.e., the destination subject address; the translator has a dedicated abstract register for the destination address). In the case of an extended basic block, to compensate for the fact that intervening jumps are being eliminated, as each new constituent basic block is assimilated by the decoding process, the IR tree for the calculation of that block's subject address is pruned 54 (FIG. 4). In other words, when the translator 19 statically calculates B's address and decoding resumes at B's starting address, the IR tree corresponding to the dynamic calculation of B's subject address 31 (which was constructed in the course of decoding A) is pruned; when decoding proceeds to the starting address of C, the IR tree corresponding to C's subject address is pruned 59; and so forth. "Pruning" an IR tree means to remove any IR nodes which are depended on by the destination address abstract register and by no other abstract registers. Put differently, pruning breaks the link between the IR tree and the destination abstract register; any other links to the same IR tree remain unaffected. In some cases, a pruned IR tree may also be depended on by another abstract register, in which case the IR tree remains to preserve the subject program's execution semantics.

To prevent code explosion (traditionally, the mitigating factor against such code specialization techniques), the translator limits extended basic blocks to some maximum number of subject instructions. In one embodiment, extended basic blocks are limited to a maximum of 200 subject instructions.

Isoblocks

Another optimization implemented in the illustrated embodiment is so-called "isoblocking." According to this technique, translations of basic blocks are parameterized, or specialized, on a compatibility list, Which is a set of variable conditions that describe the subject processor state and the translator state. The compatibility list is different for each subject architecture, to take into account different architectural features. The actual values of the compatibility conditions at the entry and exit of a particular basic block translation are referred to as entry conditions and exit conditions, respectively.

If execution reaches a basic block which has already been translated but the previous translation's entry conditions differ from the current working conditions (i.e., the exit conditions of the previous block), then the basic block must be translated again, this time based on the current working conditions. The result is that the same subject code basic block is now represented by multiple target code translations. These different translations of the same basic block are referred to as isoblocks.

To support isoblocks, the data associated with each basic block translation includes one set of entry conditions 35 and one set of exit conditions 36 (FIG. 3). In one embodiment, the basic block cache 23 is organized first by subject address 31 and then by entry conditions 35, 36 (FIG. 3). In another embodiment, when the translator queries the basic block cache 23 for a subject address 31, the query may return multiple translated basic blocks (isoblocks).

Figure 5:
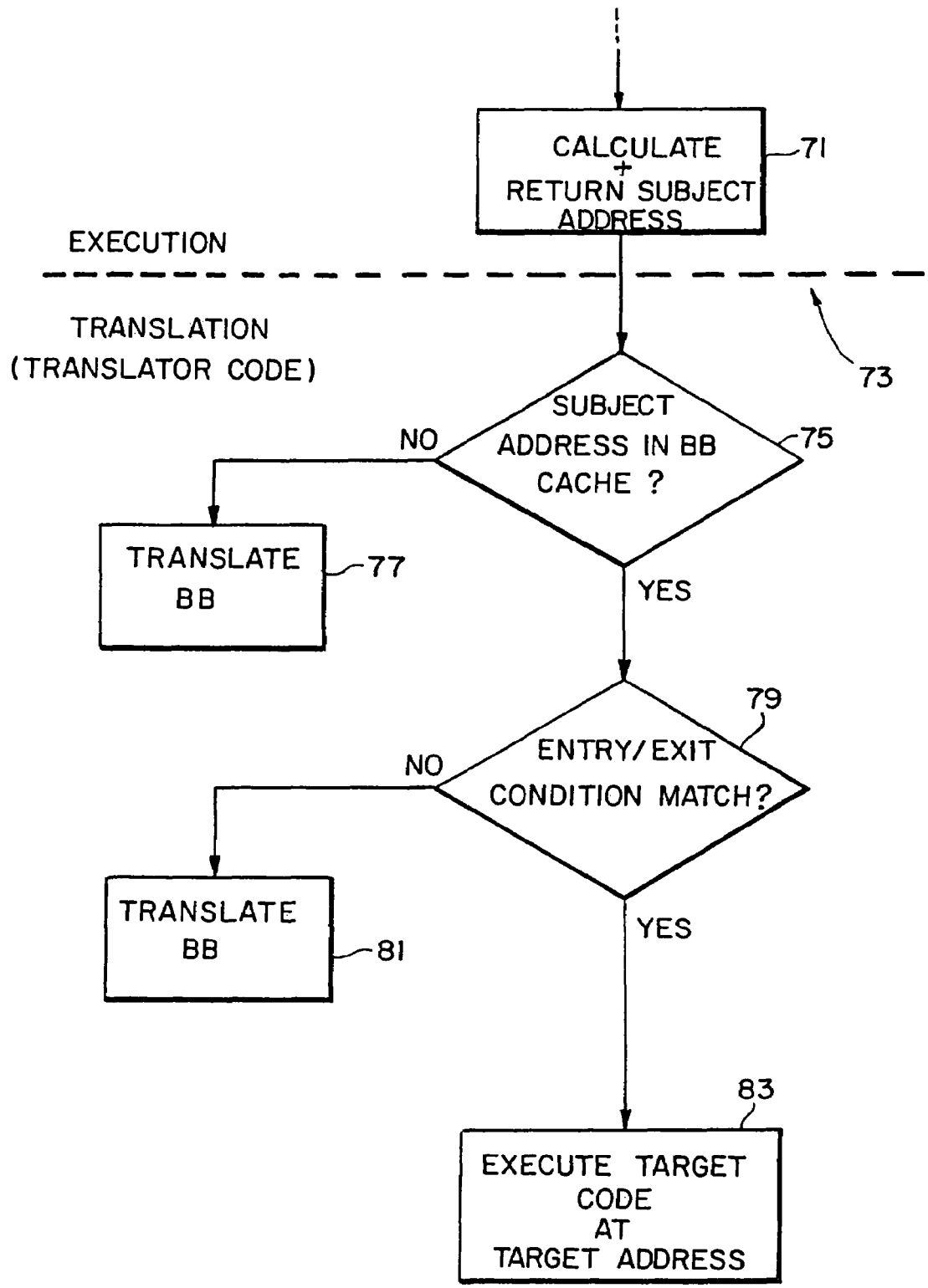
FIG. 5 is a flow diagram illustrating isoblocking.

FIG. 5 illustrates the use of isoblocks. At the end of a first translated block's execution, the translated code 21 calculates and returns the subject address of the next block (i.e., the successor) 71. Control is then returned to the translator 19, as demarcated by dashed line 73. In the translator 19, the basic block cache 23 is queried using the returned subject address 31, step 75. The basic block cache may return zero, one, or more than one basic block data structures with the same subject address 31. If the basic block cache 23 returns zero data structures (meaning that this basic block has not yet been translated), then the basic block must be translated, step 77, by the translator 19. Each data structure returned by the basic block cache 23 corresponds to a different translation (isoblock) of the same basic block of subject code. As illustrated at decision diamond 79, if the current exit conditions (of the first translated block) do not match the entry conditions of any of the data structures returned by the basic block cache 23, then the basic block must be translated again, step 81, this time parameterized on those exit conditions. If the current exit conditions match the entry conditions of one of the data structures returned by the basic block cache 23, then that translation is compatible and can be executed without re-translation, step 83. In the illustrative embodiment, the translator 19 executes the compatible translated block by dereferencing the target address as a function pointer.

As noted above, basic block translations are preferably parameterized on a compatibility list. Exemplary compatibility lists will now be described for both the X86 and PowerPC architectures.

An illustrative compatibility list for the X86 architecture includes representations of: (1) lazy propagation of subject registers; (2) overlapping abstract registers; (3) type of pending condition code flag-affecting instruction; (4) lazy propagation of condition code flag-affecting instruction parameters; (5) direction of string copy operations; (6) floating point unit (FPU) mode of the subject processor; and (7) modifications of the segment registers.

The compatibility list for the X86 architecture includes representations of any lazy propagation of subject registers by the translator, also referred to as register aliasing. Register aliasing occurs when the translator knows that two subject registers contain the same value at a basic block boundary. As long as the subject register values remain the same, only one of the corresponding abstract registers is synchronized, by saving it to the global register store. Until the saved subject register is overwritten, references to the non-saved register simply use or copy (via a move instruction) the saved register. This avoids two memory accesses (save+restore) in the translated code.

The compatibility list for the X86 architecture includes representations of which of the overlapping abstract registers are currently defined. In some cases, the subject architecture contains multiple overlapping subject registers which the translator represents using multiple overlapping abstract registers. For example, variable-width subject registers are represented using multiple overlapping abstract registers, one for each access size. For example, the X86 "EAX" register can be accessed using any of the following subject registers, each of which has a corresponding abstract register: EAX (bits 31 . . . 0), AX (bits 15 . . . 0), AH (bits 15 . . . 8), and AL (bits 7 . . . 0).

The compatibility list for the X86 architecture includes representations of, for each integer and floating point condition code flag, whether the flag value is normalized or pending, and if pending the type of the pending flag-affecting instruction.

The compatibility list for the X86 architecture includes representations of register aliasing for condition code flag-affecting instruction parameters (if some subject register still holds the value of a flag-affecting instruction parameter, or if the value of the second parameter is the same as the first). The compatibility list also includes representations of whether the second parameter is a small constant (i.e., an immediate instruction candidate), and if so its value.

The compatibility list for the X86 architecture includes a representation of the current direction of string copy operations in the subject program. This condition field indicates whether string copy operations move upward or downward in memory. This supports code specialization of "strcpy( )" function calls, by parameterizing translations on the function's direction argument.

The compatibility list for the X86 architecture includes a representation of the FPU mode of the subject processor. The FPU mode indicates whether subject floating-point instructions are operating in 32- or 64-bit mode.

The compatibility list for the X86 architecture includes a representation of modifications of the segment registers. All X86 instruction memory references are based on one of six memory segment registers: CS (code segment), DS (data segment), SS (stack segment), ES (extra data segment), FS (general purpose segment), and GS (general purpose segment). Under normal circumstances an application will not modify the segment registers. As such, code generation is by default specialized on the assumption that the segment register values remain constant. It is possible, however, for a program to modify its segment registers, in which case the corresponding segment register compatibility bit will be set, causing the translator to generate code for generalized memory accesses using the appropriate segment register's dynamic value.

An illustrative embodiment of a compatibility list for the PowerPC architecture includes representations of: (1) mangled registers; (2) link value propagation; (3) type of pending condition code flag-affecting instruction; (4) lazy propagation of condition code flag-affecting instruction parameters; (5) condition code flag value aliasing; and (6) summary overflow flag synchronization state.

The compatibility list for the PowerPC architecture includes a representation of mangled registers. In cases where the subject code contains multiple consecutive memory accesses using a subject register for the base address, the translator may translate those memory accesses using a mangled target register. In cases where subject program data is not located at the same address in target memory as it would have been in subject memory, the translator must include a target offset in every memory address calculated by the subject code. While the subject register contains the subject base address, a mangled target register contains the target address corresponding to that subject base address (i.e., subject base address+target offset). With register mangling, memory accesses can be translated more efficiently by applying the subject code offsets directly to the target base address, stored in the mangled register. By comparison, without the mangled register mechanism this scenario would require additional manipulation of the target code for each memory access, at the cost of both space and execution time. The compatibility list indicates which abstract registers if any are mangled.

The compatibility list for the PowerPC architecture includes a representation of link value propagation. For leaf functions (i.e., functions that call no other functions), the function body may be extended (as with the extended basic block mechanism discussed above) into the call/return site. Hence, the function body and the code that follows the function's return are translated together. This is also referred to as function return specialization, because such a translation includes code from, and is therefore specialized on, the function's return site. Whether a particular block translation used link value propagation is reflected in the exit conditions. As such, when the translator encounters a block whose translation used link value propagation, it must evaluate whether the current return site will be the same as the previous return site.

Functions return to the same location from which they are called, so the call site and return site are effectively the same (offset by one or two instructions). The translator can therefore determine whether the return sites are the same by comparing the respective call sites; this is equivalent to comparing the subject addresses of the respective predecessor blocks (of the function block's prior and current executions). As such, in embodiments that support link value propagation, the data associated with each basic block translation includes a reference to the predecessor block translation (or some other representation of the predecessor block's subject address).

The compatibility list for the PowerPC architecture includes representations of, for each integer and floating point condition code flag, whether the flag value is normalized or pending, and if pending the type of the pending flag-affecting instruction.

The compatibility list for the PowerPC architecture includes representations of register aliasing for flag-affecting instruction parameters (if flag-affecting instruction parameter values happen to be live in a subject register, or if the value of the second parameter is the same as the first). The compatibility list also includes representations of whether the second parameter is a small constant (i.e., an immediate instruction candidate), and if so its value.

The compatibility list for the PowerPC architecture includes representations of register aliasing for the PowerPC condition code flag values. The PowerPC architecture includes instructions for explicitly loading the entire set of PowerPC flags into a general purpose (subject) register. This explicit representation of the subject flag values in subject registers interferes with the translator's condition code flag emulation optimizations. The compatibility list contains a representation of whether the flag values are live in a subject register, and if so which register. During IR generation, references to such a subject register while it holds the flag values are translated into references to the corresponding abstract registers. This mechanism eliminates the need to explicitly calculate and store the subject flag values in a target register, which in turn allows the translator to apply the standard condition code flag optimizations.

The compatibility list for the PowerPC architecture includes a representation of summary overflow synchronization. This field indicates which of the eight summary overflow condition bits are current with the global summary overflow bit. When one of the PowerPC's eight condition fields is updated, if the global summary overflow is set, it is copied to the corresponding summary overflow bit in the particular condition code field.

Translation Hints

Another optimization implemented in the illustrative embodiment employs the translation hints 34 of the basic block data structure of FIG. 3. This optimization proceeds from a recognition that there is static basic block data which is specific to a particular basic block, but which is the same for every translation of that block. For some types of static data which are expensive to calculate, it is more efficient for the translator to calculate the data once, during the first translation of the corresponding block, and then store the result for future translations of the same block. Because this data is the same for every translation of the same block, it does not parameterize translation and therefore it is not formally part of the block's compatibility list (discussed above). Expensive static data is still stored in the data associated with each basic block translation, however, as it is cheaper to save the data than it is to recalculate. In later translations of the same block, even if the translator 19 cannot reuse a prior translation, the translator 19 can take advantage of these "translation hints" (i.e., the cached static data) to reduce the translation cost of the second and later translations.

In one embodiment, the data associated with each basic block translation includes translation hints, which are calculated once during the first translation of that block and then copied (or referred to) on each subsequent translation.

For example, in a translator 19 implemented in C++, translation hints may be implemented as a C++ object, in which case the basic block objects which correspond to different translations of the same block would each store a reference to the same translation hints object. Alternatively, in a translator implemented in C++, the basic block cache 23 may contain one basic block object per subject basic block (rather than per translation), with each such object containing or holding a reference to the corresponding translation hints; such basic block objects also contain multiple references to translation objects that correspond to different translations of that block, organized by entry conditions.

Exemplary translation hints for the X86 architecture include representations of: (1) initial instruction prefixes; and (2) initial repeat prefixes. Such translation hints for the X86 architecture particularly include a representation of how many prefixes the first instruction in the block has. Some X86 instructions have prefixes which modify the operation of the instruction. This architectural feature makes it difficult (i.e., expensive) to decode an X86 instruction stream. Once the number of initial prefixes is determined during the first decoding of the block, that value is then stored by the translator 19 as a translation hint, so that subsequent translations of the same bock do not need to determine it anew.

The translation hints for the X86 architecture further include a representation of whether the first instruction in the block has a repeat prefix. Some X86 instructions such as string operations have a repeat prefix which tells the processor to execute that instruction multiple times. The translation hints indicate whether such a prefix is present, and if so its value.

In one embodiment, the translation hints associated with each basic block additionally include the entire IR forest corresponding to that basic block. This effectively caches all of the decoding and IR generation performed by the frontend. In another embodiment, the translation hints include the IR forest as it exists prior to being optimized. In another embodiment, the IR forest is not cached as a translation hint, in order to conserve the memory resources of the translated program.

Group Blocks

Another optimization implemented in the illustrative translator embodiment is directed to eliminating program overhead resulting from the necessity to synchronize all abstract registers at the end of execution of each translated basic block. This optimization is referred to as group block optimization.

As discussed above, in basic block mode (e.g., FIG. 2), state is passed from one basic block to the next using a memory region which is accessible to all translated code sequences, namely, a global register store 27. The global register store 27 is a repository for abstract registers, each of which corresponds to and emulates the value of a particular subject register or other subject architectural feature. During the execution of translated code 21, abstract registers are held in target registers so that they may participate in instructions. During the execution of translated code 21, abstract register values are stored in the global register store 27 or target registers 15.

Thus, in basic block mode such as illustrated in FIG. 2, all abstract registers must be synchronized at the end of each basic block for two reasons: (1) control returns to the translator code 19, which potentially overwrites all target registers; and (2) because code generation only sees one basic block at a time, the translator 19 must assume that all abstract registers values are live (i.e., will be used in subsequent basic blocks) and therefore must be saved. The goal of the group block optimization mechanism is to reduce synchronization across basic block boundaries that are crossed frequently, by translating multiple basic blocks as a contiguous whole. By translating multiple basic blocks together, the synchronization at block boundaries can be minimized if not eliminated.

Group block construction is triggered when the current block's profiling metric reaches a trigger threshold. This block is referred to as the trigger block. Construction can be separated into the following steps (FIG. 6): (1) selecting member blocks 71; (2) ordering member blocks 73; (3) global dead code elimination 75; (4) global register allocation 77; and (5) code generation 79. The first step 71 identifies the set of blocks that are to be included in the group block by performing a depth-first search (DFS) traversal of the program's control flow graph, beginning with the trigger block and tempered by an inclusion threshold and a maximum member limit. The second step 73 orders the set of blocks and identifies the critical path through the group block, to enable efficient code layout that minimizes synchronization code and reduces branches. The third and fourth steps 75, 77 perform optimizations. The final step 79 generates target code for all member blocks in turn, producing efficient code layout with efficient register allocation.

Figure 6:
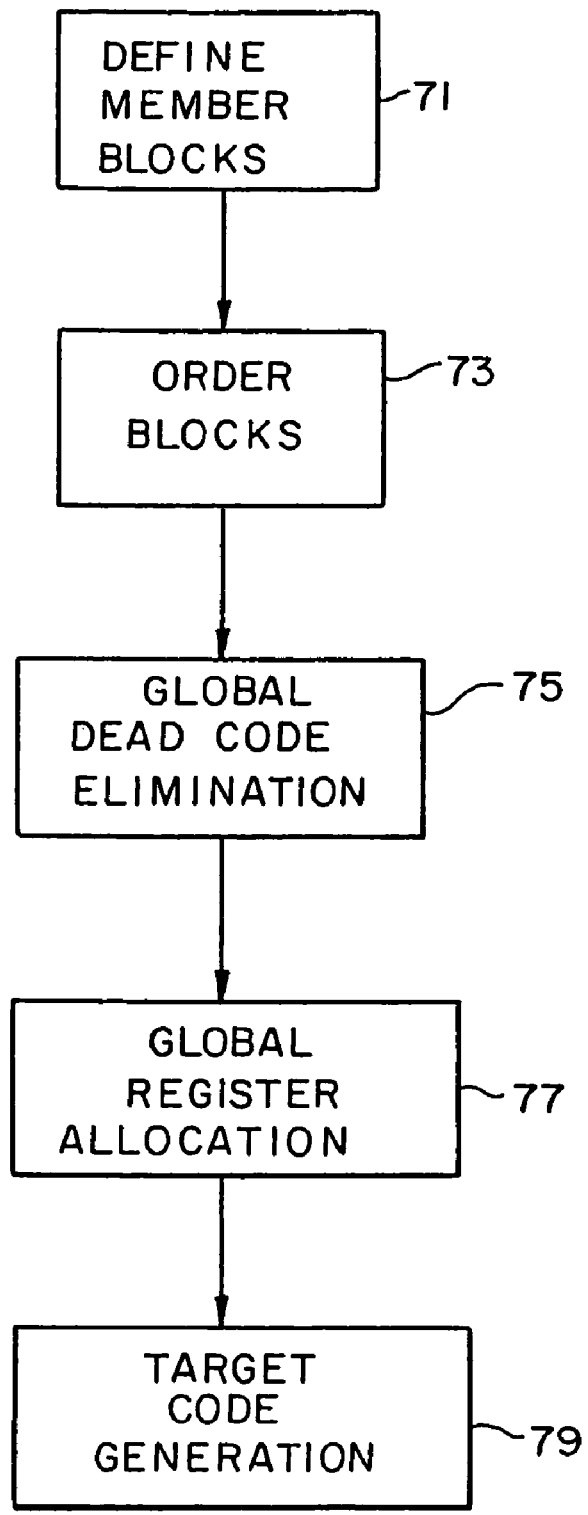
FIG. 6 is a flow diagram illustrating group blocking and attendant optimizations.

In construction of a group block and generation of target code therefrom, the translator code 19 implements the steps illustrated in FIG. 6. When the translator 19 encounters a basic block that was previously translated, prior to executing that block, the translator 19 checks the block's profiling metric 37 (FIG. 3) against the trigger threshold. The translator 19 begins group block creation when a basic block's profiling metric 37 exceeds the trigger threshold. The translator 19 identifies the members of the group block by a traversal of the control flow graph, starting with the trigger block and tempered by the inclusion threshold and maximum member limit. Next, the translator 19 creates an ordering of the member blocks, which identifies the critical path through the group block. The translator 19 then performs global dead code elimination; the translator 19 gathers register liveness information for each member block, using the IR corresponding to each block. Next, the translator 19 performs global register allocation according to an architecture-specific policy, which defines a partial set of uniform register mappings for all member blocks. Finally, the translator 19 generates target code for each member block in order, consistent with the global register allocation constraints and using the register liveness analyses.

As noted above, the data associated with each basic block includes a profiling metric 37. In one embodiment, the profiling metric 37 is execution count, meaning that the translator 19 counts the number of times a particular basic block has been executed; in this embodiment, the profiling metric 37 is represented as an integer count field (counter). In another embodiment, the profiling metric 37 is execution time, meaning that the translator 19 keeps a running aggregate of the execution time for all executions of a particular basic block, such as by planting code in the beginning and end of a basic block to start and stop, respectively, a hardware or software timer; in this embodiment, the profiling metric 37 uses some representation of the aggregate execution time (timer). In another embodiment, the translator 19 stores multiple types of profiling metrics 37 for each basic block. In another embodiment, the translator 19 stores multiple sets of profiling metrics 37 for each basic block, corresponding to each predecessor basic block and/or each successor basic block, such that distinct profiling data is maintained for different control paths. In each translator cycle (i.e., the execution of translator code 19 between executions of translated code 21), the profiling metric 37 for the appropriate basic block is updated.

In embodiments that support group blocks, the data associated with each basic block additionally includes references 38, 39 to the basic block objects of known predecessors and successors. These references in aggregate constitute a control-flow graph of all previously executed basic blocks. During group block formation, the translator 19 traverses this control-flow graph to determine which basic blocks to include in the group block under formation.

Group block formation in the illustrative embodiment is based on three thresholds: a trigger threshold, an inclusion threshold, and a maximum member limit. The trigger threshold and the inclusion threshold refer to the profiling metric 37 for each basic block. In each translator cycle, the profiling metric 37 of the next basic block is compared to the trigger threshold. If the metric 37 meets the trigger threshold then group block formation begins. The inclusion threshold is then used to determine the scope of the group block, by identifying which successor basic blocks to include in the group block. The maximum member limit defines the upper limit on the number of basic blocks to be included in any one group block.

When the trigger threshold is reached for basic block A, a new group block is formed with A as the trigger block. The translator 19 then begins the definition traversal, a traversal of A's successors in the control-flow graph to identify other member blocks to include. When traversal reaches a given basic block, its profiling metric 37 is compared to the inclusion threshold. If the metric 37 meets the inclusion threshold, that basic block is marked for inclusion and the traversal continues to the block's successors. If the block's metric 37 is below the inclusion threshold, that block is excluded and its successors are not traversed. When traversal ends (i.e., all paths either reach an excluded block or cycle back to an included block, or the maximum member limit is reached), the translator 19 constructs a new group block based on all of the included basic blocks.

In embodiments that use isoblocks and group blocks, the control flow graph is a graph of isoblocks, meaning that different isoblocks of the same subject block are treated as different blocks for the purposes of group block creation. Thus, the profiling metrics for different isoblocks of the same subject block are not aggregated.

In another embodiment, isoblocks are not used in basic block translation but are used in group block translation, meaning that non-group basic block translations are generalized (not specialized on entry conditions). In this embodiment, a basic block's profiling metric is disaggregated by the entry conditions of each execution, such that distinct profiling information is maintained for each theoretical isoblock (i.e., for each distinct set of entry conditions). In this embodiment, the data associated with each basic block includes a profiling list, each member of which is a three-item set containing: (1) a set of entry conditions, (2) a corresponding profiling metric, and (3) a list of corresponding successor blocks. This data maintains profiling and control path information for each set of entry conditions to the basic block, even though the actual basic block translation is not specialized on those entry condition. In this embodiment, the trigger threshold is compared to each profiling metric within a basic block's profiling metric list. When the control flow graph is traversed, each element in a given basic block's profiling list is treated as a separate node in the control flow graph. The inclusion threshold is therefore compared against each profiling metric in the block's profiling list. In this embodiment, group blocks are created for particular hot isoblocks (specialized to particular entry conditions) of hot subject blocks, but other isoblocks of those same subject blocks are executed using the general (non-isoblock) translations of those blocks.

After the definition traversal, the translator 19 performs an ordering traversal, step 73; FIG. 6, to determine the order in which member blocks will be translated. The order of the member blocks affects both the instruction cache behavior of the translated code 21 (hot paths should be contiguous) and the synchronization necessary on member block boundaries (synchronization should be minimized along hot paths). In one embodiment, the translator 19 performs the ordering traversal using an ordered depth-first search (DFS) algorithm, ordered by execution count. Traversal starts at the member block having the highest execution count. If a traversed member block has multiple successors, the successor with the higher execution count is traversed first.

One of ordinary skill in the art will appreciate that group blocks are not formal basic blocks, as they may have internal control branches, multiple entry points, and/or multiple exit points.

Once a group block has been formed, a further optimization may be applied to it, referred to herein as "global dead code elimination." Such global dead code elimination employs the technique of liveness analysis. Global dead code elimination is the process of removing redundant work from the IR across a group of basic blocks.

Generally, subject processor state must be synchronized on translation scope boundaries. A value, such as a subject register, is said to be "live" for the range of code starting with its definition and ending with its last use prior to being re-defined (overwritten); hence, the analysis of values' (e.g., temporary values in the context of IR generation, target registers in the context of code generation, or subject registers in the context of translation) uses and definitions is known in the art as liveness analysis. Whatever knowledge (i.e., liveness analysis) the translator has regarding the uses (reads) and definitions (writes) of data and state is limited to its translation scope; the rest of the program is an unknown. More specifically, because the translator does not know which subject registers will be used outside the scope of translation (e.g., in a successor basic block), it must assume that all registers will be used. As such, the values (definitions) of any subject registers which were modified within a given basic block must be saved (stored to the global register store 27) at the end of that basic block, against the possibility of their future use. Likewise, all subject registers whose values will be used in a given basic block must be restored (loaded from the global register store 27) at the beginning of that basic block; i.e., the translated code for a basic block must restore a given subject register prior to its first use within that basic block.

The general mechanism of IR generation involves an implicit form of "local" dead code elimination, whose scope is localized to only a small group of IR nodes at once. For example, a common subexpression A in the subject code would be represented by a single IR tree for A with multiple parent nodes, rather than multiple instances of the expression tree A itself. The "elimination" is implicit in the fact that one IR node can have links to multiple parent nodes. Likewise, the use of abstract registers as IR placeholders is an implicit form of dead code elimination. If the subject code for a given basic block never defines a particular subject register, then at the end of IR generation for that block, the abstract register corresponding to that subject register will refer to an empty IR tree. The code generation phase recognizes that, in this scenario, the appropriate abstract register need not be synchronized with the global register store. As such, local dead code elimination is implicit in the IR generation phase, occurring incrementally as IR nodes are created.

In contrast to local dead code elimination, a "global" dead code elimination algorithm is applied to a basic block's entire IR expression forest. Global dead code elimination according to the illustrative embodiment requires liveness analysis, meaning analysis of subject register uses (reads) and subject register definitions (writes) within the scope of each basic block in a group block, to identify live and dead regions. The IR is transformed to remove dead regions and thereby reduce the amount of work that must be performed by the target code. For example, at a given point in the subject code, if the translator 19 recognizes or detects that a particular subject register will be defined (overwritten) before its next use, the subject register is said to be dead at all points in the code up to that preempting definition. In terms of the IR, subject registers which are defined but never used before being re-defined are dead code which can be eliminated in the IR phase without ever spawning target code. In terms of target code generation, target registers which are dead can be used for other temporary or subject register values without spilling.

In group block global dead code elimination, liveness analysis is performed on all member blocks. Liveness analysis generates the IR forest for each member block, which is then used to derive the subject register liveness information for that block. IR forests for each member block are also needed in the code generation phase of group block creation. Once the IR for each member block is generated in liveness analysis, it can either be saved for subsequent use in code generation, or it can be deleted and re-generated during code generation.

Group block global dead code elimination can effectively "transform" the IR in two ways. First, the IR forest generated for each member block during liveness analysis can be modified, and then that entire IR forest can be propagated to (i.e., saved and reused during) the code generation phase; in this scenario, the IR transformations are propagated through the code generation phase by applying them directly to the IR forest and then saving the transformed IR forest. In this scenario, the data associated with each member block includes liveness information (to be additionally used in global register allocation), and the transformed IR forest for that block.

Alternatively and preferably, the step of global dead code elimination which transforms the IR for a member block is performed during the final code generation phase of group block creation, using liveness information created earlier. In this embodiment, the global dead code transformations can be recorded as list of "dead" subject registers, which is then encoded in the liveness information associated with each member block. The actual transformation of the IR forest is thus performed by the subsequent code generation phase, which uses the dead register list to prune the IR forest. This scenario allows the translator to generate the IR once during liveness analysis, then throw the IR away, and then re-generate the same IR during the code generation, at which point the IR is transformed using the liveness analysis (i.e., global dead code elimination is applied to the IR itself). In this scenario, the data associated with each member block includes liveness information, which includes a list of dead subject registers. The IR forest is not saved. Specifically, after the IR forest is (re)generated in the code generation phase, the IR trees for dead subject registers (which are listed in the dead subject register list within the liveness information) are pruned.

In one embodiment, the IR created during liveness analysis is thrown away after the liveness information is extracted, to conserve memory resources. The IR forests (one per member block) are recreated during code generation, one member block at a time. In this embodiment, the IR forests for all member blocks do not coexist at any point in translation. However, the two versions of the IR forests, created during liveness analysis and code generation, respectively, are identical, as they are generated from the subject code using the same IR generation process.

In another embodiment, the translator creates an IR forest for each member block during liveness analysis, and then saves the IR forest, in the data associated with each member block, to be reused during code generation. In this embodiment, the IR forests for all member blocks coexist, from the end of liveness analysis (in the global dead code elimination step) to code generation. In one alternative of this embodiment, no transformations or optimizations are performed on the IR during the period from its initial creation (during liveness analysis) and its last use (code generation).

In another embodiment, the IR forests for all member blocks are saved between the steps of liveness analysis and code generation, and inter-block optimizations are performed on the IR forests prior to code generation. In this embodiment, the translator takes advantage of the fact that all member block IR forests coexist at the same point in translation, and optimizations are performed across the IR forests of different member blocks which transform those IR forests. In this case, the IR forests used in code generation may not be identical to the IR forests used in liveness analysis (as in the two embodiments described above), because the IR forests have been subsequently transformed by inter-block optimizations. In other words, the IR forests used in code generation may be different than the IR forests that would result from generating them anew one member block at a time.

In group block global dead code elimination, the scope of dead code detection is increased by the fact that liveness analysis is applied to multiple blocks at the same time. Hence, if a subject register is defined in the first member block, and then redefined in the third member block (with no intervening uses or exit points), the IR tree for the first definition can be eliminated from the first member block. By comparison, under basic block code generation, the translator 19 would be unable to detect that this subject register was dead.

As noted above, one goal of group block optimization is to reduce or eliminate the need for register synchronization at basic block boundaries. Accordingly, a discussion of how register allocation and synchronization is achieved by the translator 19 during group blocking is now provided.

Register allocation is the process of associating an abstract (subject) register with a target register. Register allocation is a necessary component of code generation, as abstract register values must reside in target registers to participate in target instructions. The representation of these allocations (i.e., mappings) between target registers and abstract registers is referred to as a register map. During code generation, the translator 19 maintains a working register map, which reflects the current state of register allocation (i.e., the target-to-abstract register mappings actually in existence at a given point in the target code). Reference will be had hereafter to an exit register map which is, abstractly, a snapshot of the working register map on exit from a member block. However, since the exit register map is not needed for synchronization, it is not recorded so it is purely abstract. The entry register map 40 (FIG. 3) is a snapshot of the working register map on entry to a member block, which is necessary to record for synchronization purposes.

Also, as discussed above, a group block contains multiple member blocks, and code generation is performed separately for each member block. As such, each member block has its own entry register map 40 and exit register map, which reflect the allocation of particular target registers to particular subject registers at the beginning and end, respectively, of the translated code for that block.

Code generation for a group member block is parameterized by its entry register map 40 (the working register map on entry), but code generation also modifies the working register map. The exit register map for a member block reflects the working register map at the end of that block, as modified by the code generation process. When the first member block is translated, the working register map is empty (subject to global register allocation, discussed below). At the end of translation for the first member block, the working register map contains the register mappings created by the code generation process. The working register map is then copied into the entry register maps 40 of all successor member blocks.

At the end of code generation for a member block, some abstract registers may not require synchronization. Register maps allow the translator 19 to minimize synchronization on member block boundaries, by identifying which registers actually require synchronization. By comparison, in the (non-group) basic block scenario all abstract registers must be synchronized at the end of every basic block.

At the end of a member block, three synchronization scenarios are possible based on the successor. First, if the successor is a member block which has not yet been translated, its entry register map 40 is defined to be the same as the working register map, with the consequence that no synchronization is necessary. Second, if the successor block is external to the group, then all abstract registers must be synchronized (i.e., a full synchronization) because control will return to the translator code 19 before the successor's execution. Third, if the successor block is a member block whose register map has already been fixed, then synchronization code must be inserted to reconcile the working map with the successor's entry map.

Some of the cost of register map synchronization is reduced by the group block ordering traversal, which minimizes register synchronization or eliminates it entirely along hot paths. Member blocks are translated in the order generated by the ordering traversal. As each member block is translated, its exit register map is propagated into the entry register map 40 of all successor member blocks whose entry register maps are not yet fixed. In effect, the hottest path in the group block is translated first, and most if not all member block boundaries along that path require no synchronization because the corresponding register maps are all consistent.

For example, the boundary between the first and second member blocks will always require no synchronization, because the second member block will always have its entry register map 40 fixed to be the same as the exit register map 41 of the first member block. Some synchronization between member blocks may be unavoidable because group blocks can contain internal control branches and multiple entry points. This means that execution may reach the same member block from different predecessors, with different working register maps at different times. These cases require that the translator 19 synchronize the working register map with the appropriate member block's entry register map.

If required, register map synchronization occurs on member block boundaries. The translator 19 inserts code at the end of a member block to synchronize the working register map with the successor's entry register map 40. In register map synchronization, each abstract register falls under one of ten synchronization conditions. Table 1 illustrates the ten register synchronization cases as a function of the translator's working register map and the successor's entry register map 40. Table 2 describes the register synchronization algorithm, by enumerating the ten formal synchronization cases with text descriptions of the cases and pseudo-code descriptions of the corresponding synchronization actions (the pseudo-code is explained below). Thus, at every member block boundary, every abstract register is synchronized using the 10-case algorithm. This detailed articulation of synchronization conditions and actions allows the translator 19 to generate efficient synchronization code, which minimizes the synchronization cost for each abstract register.

The following describes the synchronization action functions listed in Table 2. "Spill(E(a))" saves abstract register a from target register E(a) into the subject register bank (a component of the global register store). "Fill(t,a)" loads abstract register a from the subject register bank into target register t. "Reallocate( )" moves and reallocates (i.e., changes the mapping of) an abstract register to a new target register if available, or spills the abstract register if a target register is not available. "FreeNoSpill(t)" marks a target register as free without spilling the associated abstract subject register. The FreeNoSpill( ) function is necessary to avoid superfluous spilling across multiple applications of the algorithm at the same synchronization point. Note that for cases with a "Nil" synchronization action, no synchronization code is necessary for the corresponding abstract registers.

TABLE 1

Enumeration of the 10 Register Synchronization Scenarios

| | a ∈ dom W | | a ∉ dom W |
|---|---|---|---|
| | W(a) ∉ rng E | W(a) ∈ rng E | |
| a ∈ dom E | E(a) ∉ rng W<br>E(a) ∈ rng W | 6<br>7 | 8<br>W(a) ≠ E(a) 9<br>W(a) = E(a) 10 | 4<br>5 |
| a ∉ dom E | | 2 | 3 | 1 |

LEGEND
a     abstract subject register
t     target register
W     working register map {W(a) => t}
E     entry register map {E(a) => t}
dom     domain
rng     range
∈     is a member of
∉     is not a member of
W(a) ∉ rng E     The working register for abstract register "a" is not in the range of the entry register map. I.e., the target register that is currently mapped to abstract register "a" ("W(a)") is not defined in the entry register map E.

TABLE 2

Register Map Synchronization Scenarios

| Case | | Description | Action |
|---|---|---|---|
| 1 | a ∉ (dom E ∪ dom W) | W(...)<br>E(...)<br>The abstract register is neither in the working rmap or the entry rmap. | Nil |
| 2 | a ∈ dom W<br>∧<br>a ∉ dom E<br>∧<br>W(a) ∉ rng E | W(a=>t1,...)<br>E(...)<br>The abstract register is in the working rmap, but not in the entry rmap. Furthermore the target register used in the working rmap is not in the range of the entry rmap. | Spill(W(a)) |
| 3 | a ∈ dom W<br>∧<br>a ∉ dom E<br>∧<br>W(a) ∈ rng E | W(a1=>t1,...)<br>E(ax=>t1,...)<br>The abstract register is in the working, but not in the entry rmap. However the target register used in the working rmap is in the range of the entry rmap. | Spill(W(a)) |
| 4 | a ∉ dom W<br>∧<br>a ∈ dom E<br>∧<br>E(a) ∉ rng W | W(...)<br>E(a1=>t1,...)<br>The abstract register is in the entry rmap but not in the working rmap. Furthermore the target register used in the entry rmap is not in the range of the working rmap. | Fill(E(a), a) |
| 5 | a ∉ dom W<br>∧<br>a ∈ dom E<br>∧<br>E(a) ∈ rng W | W(ax=>t1,...)<br>E(a1=>t1,...)<br>The abstract register is in the entry rmap but not in the working rmap. However the target register used in the entry rmap is in the range of the working rmap. | Reallocate(E(a))<br>Fill(E(a), a) |
| 6 | a ∈ (dom W ∩ dom E)<br>∧<br>W(a) ∉ rng E<br>∧<br>E(a) ∉ rng W | W(a1=>t1,...)<br>E(a1=>t2,...)<br>The abstract register is in the working rmap and the entry rmap. However both use different target registers. Furthermore the target register used in the working rmap is not in the range of the entry rmap and the target register used in the entry rmap is not in the range of the working rmap. | Copy W(a) => E(a)<br>FreeNoSpill(W(a)) |
| 7 | a ∈ (dom W ∩ dom E)<br>∧<br>W(a) ∉ rng E<br>∧<br>E(a) ∈ rng W | W(a1=>t1, ax=>t2 ...)<br>E(a1=>t2,...)<br>The abstract register in the working rmap is in the entry rmap. However both use different target registers. The target register used in the working rmap is not in the range of the entry rmap, however the target register used in the entry rmap is in the range of the working rmap. | Spill(E(a))<br>Copy W(a) => E(a)<br>FreeNoSpill(W(a)) |

TABLE 2-continued

Register Map Synchronization Scenarios

| Case | | Description | Action |
|---|---|---|---|
| 8 | a ∈ (dom W ∩ dom E) ∧ W(a) ∈ rng E ∧ E(a) ∉ rng W | W(a1=>t1,...) E(a1=>t2, ax=>t1,...) The abstract register in the working rmap is in the entry rmap. However both use different target registers. The target register used in the entry rmap is not in the range of the working rmap, however the target register used in the working rmap is in the range of the entry rmap. | Copy W(a) => E(a) FreeNoSpill(W(a)) |
| 9 | a ∈ (dom W ∩ dom E) ∧ W(a) ∈ rng E ∧ E(a) ∈ rng W ∧ W(a) ≠ E(a) | W(a1=>t1, ax=>t2,...) E(a1=>t2, ay=>t1,...) The abstract register in the working rmap is in the entry rmap. Both use different target registers. However, the target register used in the entry rmap is in the range of the working rmap, and the target register used in the working rmap is in the range of the entry rmap. | Spill(E(a)) Copy W(a) => E(a) FreeNoSpill(W(a)) |
| 10 | a ∈ (dom W ∩ dom E) ∧ W(a) ∈ rng E ∧ E(a) ∈ rng W ∧ W(a) = E(a) | W(a1=>t1,...) E(a1=>t1,...) The abstract register in the working rmap is in the entry rmap. Furthermore they both map to the same target register. | Nil |

The translator 19 performs two levels of register allocation within a group block, global and local (or temporary). Global register allocation is the definition of particular register mappings, before code generation, which persist across an entire group block (i.e., throughout all member blocks). Local register allocation consists of the register mappings created in the process of code generation. Global register allocation defines particular register allocation constraints which parameterize the code generation of member blocks, by constraining local register allocation.

Abstract registers that are globally allocated do not require synchronization on member block boundaries, because they are guaranteed to be allocated to the same respective target registers in every member block. This approach has the advantage that synchronization code (which compensates for differences in register mappings between blocks) is never required for globally allocated abstract registers on member block boundaries. The disadvantage of group block register mapping is that it hinders local register allocation because the globally allocated target registers are not immediately available for new mappings. To compensate, the number of global register mappings may be limited for a particular group block.

The number and selection of actual global register allocations is defined by a global register allocation policy. The global register allocation policy is configurable based on subject architecture, target architecture, and applications translated. The optimal number of globally allocated registers is derived empirically, and is a function of the number of target registers, the number of subject registers, the type of application being translated, and application usage patterns. The number is generally a fraction of the total number of target registers minus some small number to ensure that enough target registers remain for temporary values.

In cases where there are many subject registers but few target registers, such as the MIPS-X86 and PowerPC-X86 translators, the number of globally allocated registers is zero. This is because the X86 architecture has so few target registers that using any fixed register allocation has been observed to produce worse target code than none at all.

In cases where there are many subject registers and many target registers, such as the X86-MIPS translator, the number of globally allocated registers (n) is three quarters the number of target registers (T). Hence:

$$X86\text{-}MIPS\text{: } n = \frac{3}{4} * T$$

Even though the X86 architecture has few general purpose registers, it is treated as having many subject registers because many abstract registers are necessary to emulate the complex X86 processor state (including, e.g., condition code flags).

In cases where the number of subject registers and target registers is approximately the same, such as the MIPS-MIPS accelerator, most target registers are globally allocated with only a few reserved for temporary values. Hence:

$$MIPS\text{-}MIPS\text{: } n = T - 3$$

In cases where the total number of subject registers in use across the entire group block (s) is less than or equal to the number of target registers (T), all subject registers are globally mapped. This means that the entire register map is constant across all member blocks. In the special case where (s=T), meaning that the number of target registers and active subject registers is equal, this means that there are no target registers left for temporary calculations; in this case, temporary values are locally allocated to target registers that are globally allocated to subject registers that have no further uses within the same expression tree (such information is obtained through liveness analysis).

At the end of group block creation, code generation is performed for each member block, in the traversal order. During code generation, each member block's IR forest is (re)generated and the list of dead subject registers (contained in that block's liveness information) is used to the prune the IR forest prior to generating target code. As each member block is translated, its exit register map is propagated to the entry register maps 40 of all successor member blocks (except those which have already been fixed). Because blocks are translated in traversal order, this has the effect of minimizing register map synchronization along hot paths, as well as making hot path translations contiguous in the target memory space. As with basic block translations, group member block translations are specialized on a set of entry conditions, namely the current working conditions when the group block was created.

Figure 7:
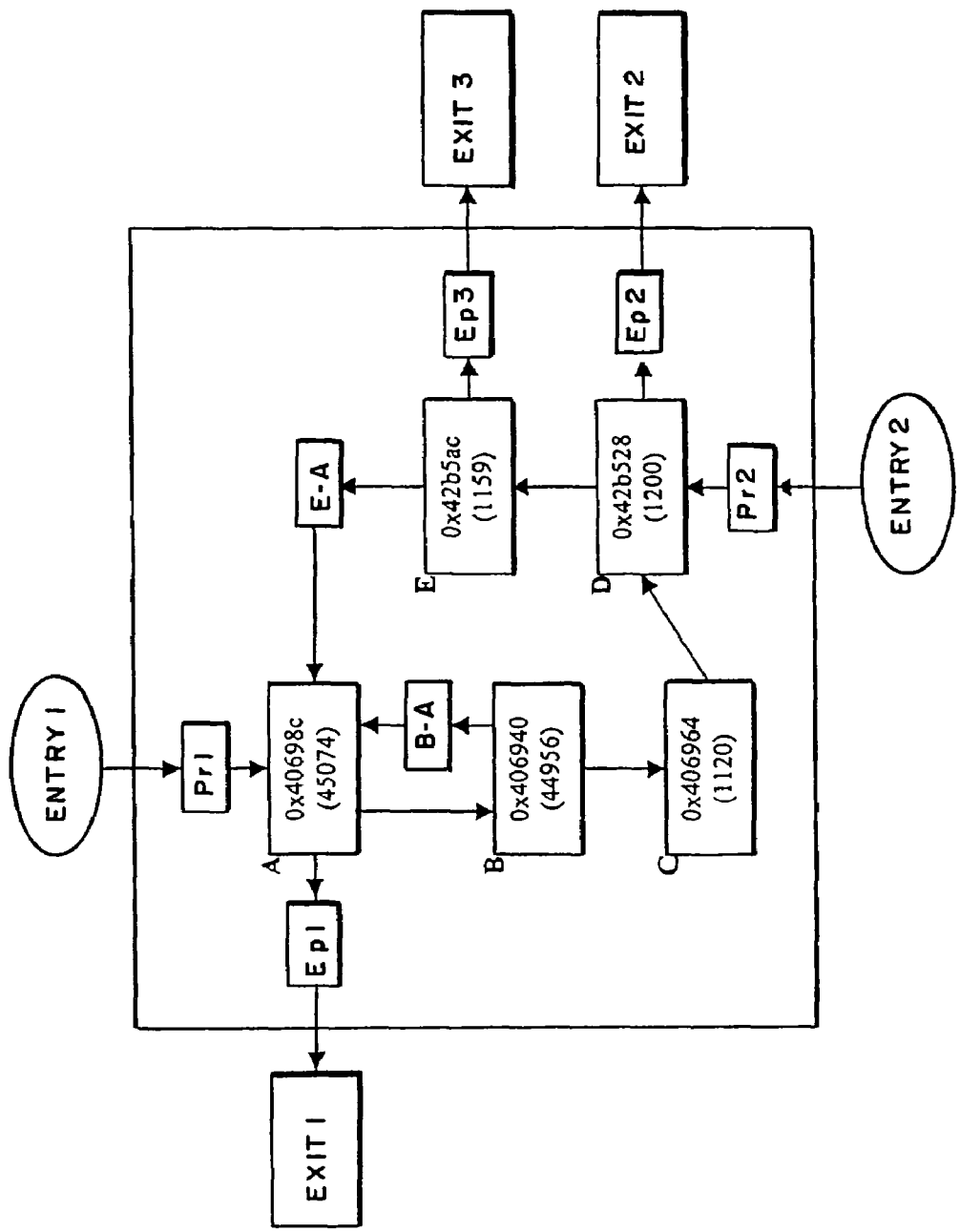
FIG. 7 is a schematic diagram of an example illustrating group block optimization.

FIG. 7 provides an example of group block generation by the translator code 19 according to an illustrative embodiment. The example group block has five members ("A" to "E"), and initially one entry point ("Entry 1"; Entry 2 is generated later through aggregation, as discussed below) and three exit points("Exit 1," "Exit 2," and "Exit 3"). In this example, the trigger threshold for group block creation is an execution count of 45000, and the inclusion threshold for member blocks is an execution count of 1000. The construction of this group block was triggered when block A's execution count (now 45074) reached the trigger threshold of 45000, at which point a search of the control flow graph was performed in order to identify the group block members. In this example, five blocks were found that exceeded the inclusion threshold of 1000. Once the member blocks are identified, an ordered depth first search (ordered by profiling metric) is performed such that hotter blocks and their successors are processed first; this produces a set of blocks with a critical path ordering.

At this stage global dead code elimination is performed. Each member block is analyzed for register uses and definitions (i.e., liveness analysis). This makes code generation more efficient in two ways. First, local register allocation can take into account which subject registers are live in the group block (i.e., which subject registers will be used in the current or successor member blocks), which helps to minimize the cost of spills; dead registers are spilled first, because they do not need to be restored. In addition, if liveness analysis shows that a particular subject register is defined, used, and then redefined (overwritten), the value can be thrown away any time after the last use (i.e., its target register can be freed). If liveness analysis shows that a particular subject register value is defined and then redefined without any intervening uses (unlikely, as this would mean that the subject compiler generated dead code), then the corresponding IR tree for that value can be thrown away, such that no target code is ever generated for it.

Global register allocation is next. The translator 19 assigns frequently accessed subject registers a fixed target register mapping which is constant across all member blocks. Globally allocated registers are non-spillable, meaning that those target registers are unavailable to local register allocation. A percentage of target registers must be kept for temporary subject register mappings when there are more subject registers than target registers. In special cases where the entire set of subject registers within the group block can fit into target registers, spills and fills are completely avoided. As illustrated in FIG. 7, the translator plants code ("Pr1") to load these registers from the global register store 27 prior to entering the head of the group block ("A"); such code is referred to as prologue loads.

The group block is now ready for target code generation. During code generation, the translator 19 uses a working register map (the mapping between abstract registers and target registers) to keep track of register allocation. The value of the working register map at the beginning of each member block is recorded in that block's associated entry register map 40.

First the prologue block Pr1 is generated which loads the globally allocated abstract registers. At this point the working register map at the end of Pr1 is copied to the entry register map 40 of block A.

Block A is then translated, planting target code directly following the target code for Pr1. Control flow code is planted to handle the exit condition for Exit 1, which consists of a dummy branch (to be patched later) to epilogue block Ep1 (to be planted later). At the end of block A, the working register map is copied to the entry register map 40 of block B. This fixing of B's entry register map 40 has two consequences: first, no synchronization is necessary on the path from A to B; second, entry to B from any other block (i.e., a member block of this group block or a member block of another group block using aggregation) requires synchronization of that block's exit register map with B's entry register map.

Block B is next on the critical path. Its target code is planted directly following block A, and code to handle the two successors, C and A, is then planted. The first successor, block C, has not yet had its entry register map 40 fixed, so the working register map is simply copied into C's entry register map. The second successor, block A, however, has previously had its entry register map 40 fixed and therefore the working register map at the end of block B and the entry register map 40 of block A may differ. Any difference in the register maps requires some synchronization ("B-A") along the path from block B to block A in order to bring the working register map into line with the entry register map 40. This synchronization takes the form of register spills, fills, and swaps and is detailed in the ten register map synchronization scenarios above.

Block C is now translated and target code is planted directly following block C. Blocks D and E are likewise translated and planted contiguously. The path from E to A again requires register map synchronization, from E's exit register map (i.e., the working register map at the end of E's translation) to A's entry register map 40, which is planted in block "E-A."

Prior to exiting the group block and returning control to the translator 19, the globally allocated registers must be synchronized to the global register store; this code is referred to as epilogue saves. After the member blocks have been translated, code generation plants epilogue blocks for all exit points (Ep1, Ep2, and Ep3), and fixes the branch targets throughout the member blocks.

In embodiments that use both isoblocks and group blocks, the control flow graph traversal is made in terms of unique subject blocks (i.e., a particular basic block in the subject code) rather than isoblocks of that block. As such, isoblocks are transparent to group block creation. No special distinction is made with respect to subject blocks that have one translation or multiple translations.

In the illustrative embodiment, both the group block and isoblock optimizations may be advantageously employed. However, the fact that the isoblock mechanism may create different basic block translations for the same subject code sequence complicates the process of deciding which blocks to include in the group block, since the blocks to be included may not exist until the group block is formed. The information collected using the unspecialized blocks that existed prior to the optimization must be adapted before being used in the selection and layout process.

The illustrative embodiment further employs a technique for accommodating features of nested loops in group block generation. Group blocks are originally created with only one entry point, namely the start of the trigger block. Nested loops in a program cause the inner loop to become hot first, creating a group block representing the inner loop. Later, the outer loop becomes hot, creating a new group block that includes all the blocks of the inner loop as well as the outer loop. If the group block generation algorithm does not take account of the work done for the inner loop, but instead re-does all of that work, then programs that contain deeply nested loops will progressively generate larger and larger group blocks, requiring more storage and more work on each group block generation. In addition, the older (inner) group blocks may become unreachable and therefore provide little or no benefit.

According to the illustrative embodiment, group block aggregation is used to enable a previously built group block to be combined with additional optimized blocks. During the phase in which blocks are selected for inclusion in a new group block, those candidates which are already included in a previous group block are identified. Rather than planting target code for these blocks, aggregation is performed, whereby the translator 19 creates a link to the appropriate location in the existing group block. Because these links may jump to the middle of the existing group block, the working register map corresponding to that location must be enforced; accordingly, the code planted for the link includes register map synchronization code as required.

The entry register map 40 stored in the basic block data structure 30 supports group block aggregation. Aggregation allows other translated code to jump into the middle of a group block, using the beginning of the member block as an entry point. Such entry points require that the current working register map be synchronized to the member block's entry register map 40, which the translator 19 implements by planting synchronization code (i.e., spills and fills) between the exit point of the predecessor and the entry point of the member block.

In one embodiment, some member blocks' register maps are selectively deleted to conserve resources. Initially, the entry register maps of all member blocks in a group are stored indefinitely, to facilitate entry into the group block (from an aggregate group block) at the beginning of any member block. As group blocks become large, some register maps may be deleted to conserve memory. If this happens, aggregation effectively divides the group block into regions, some of which (i.e., member blocks whose register maps have been deleted) are inaccessible to aggregate entry. Different policies are used to determine which register maps to store. One policy is to store all register maps of all member blocks (i.e., never delete). An alternative policy is to store register maps only for the hottest member blocks. An alternative policy is to store register maps only for member blocks that are the destinations of backward branches (i.e., the start of a loop).

In another embodiment, the data associated with each group member block includes a recorded register map for every subject instruction location. This allows other translated code to jump into the middle of a group block at any point, not just the beginning of a member block, as, in some cases, a group member block may contain undetected entry points when the group block is formed. This technique consumes large amounts of memory, and is therefore only appropriate when memory conservation is not a concern.

Group blocking provides a mechanism for identifying frequently executed blocks or sets of blocks and performing additional optimizations on them. Because more computationally expensive optimizations are applied to group blocks, their formation is preferably confined to basic blocks which are known to execute frequently. In the case of group blocks, the extra computation is justified by frequent execution; contiguous blocks which are executed frequently are referred to as a "hot path."

Embodiments may be configured wherein multiple levels of frequency and optimization are used, such that the translator 19 detects multiple tiers of frequently executed basic blocks, and increasingly complex optimizations are applied. Alternately, and as described above only two levels of optimization are used: basic optimizations are applied to all basic blocks, and a single set of further optimizations are applied to group blocks using the group block creation mechanism described above.

Overview

Figure 8:
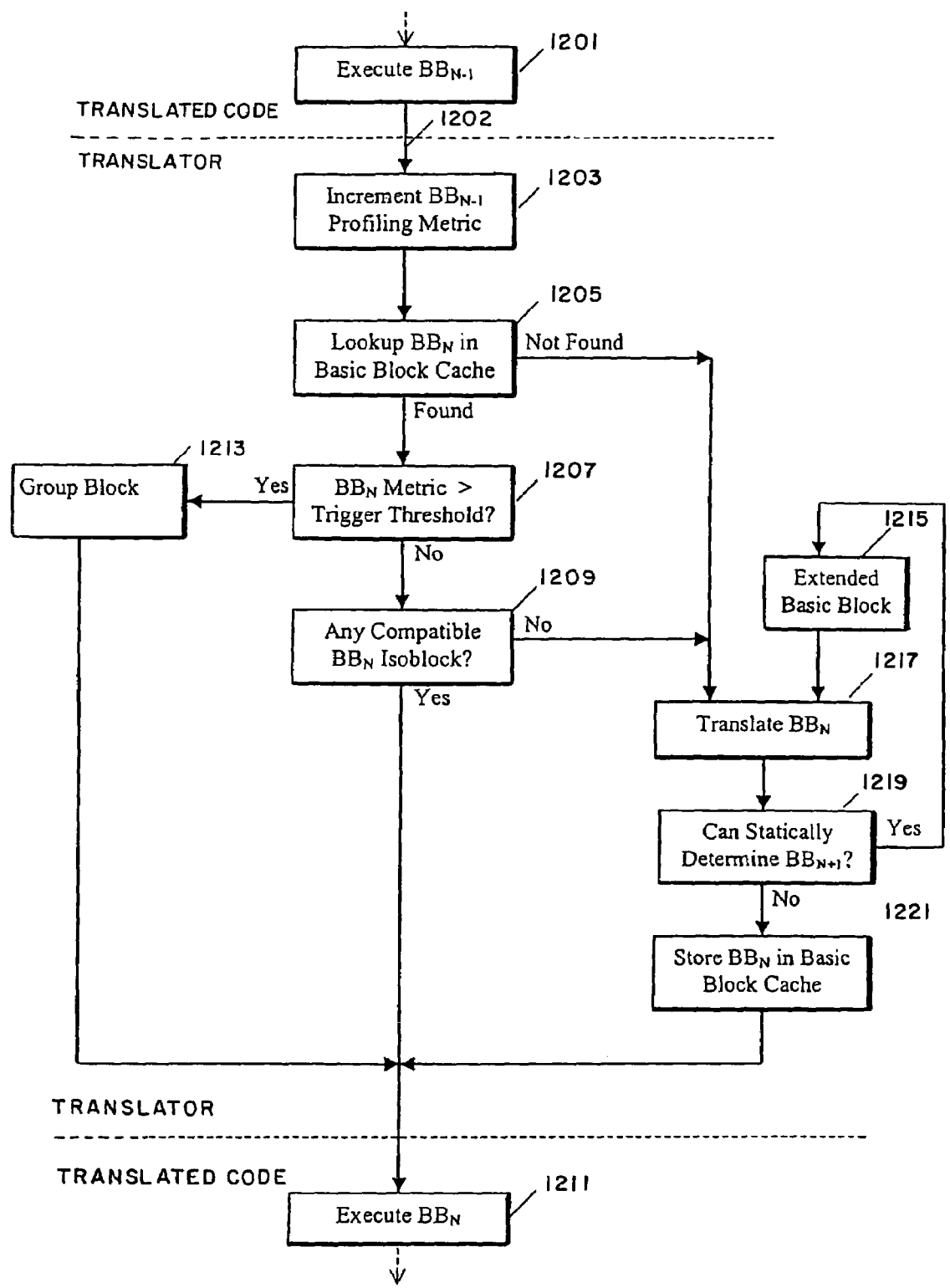
FIG. 8 is a flow diagram illustrating run-time translation, including extended basic blocking, isoblocking, and group blocking.

FIG. 8 illustrates the steps performed by the translator at run-time, between executions of translated code. When a first basic block ($BB_{N-1}$) finishes execution 1201, it returns control to the translator 1202. The translator increments the profiling metric of the first basic block 1203. The translator then queries the basic block cache 1205 for previously translated isoblocks of the current basic block ($BB_N$, which is $BB_{N-1}$'s successor), using the subject address returned by the first basic block's execution. If the successor block has already been translated, the basic block cache will return one or more basic block data structures. The translator then compares the successor's profiling metric to the group block trigger threshold 1207 (this may involve aggregating the profiling metrics of multiple isoblocks). If the threshold is not met, the translator then checks if any isoblocks returned by the basic block cache are compatible with the working conditions (i.e., isoblocks with entry conditions identical to the exit conditions of $BB_{N-1}$). If a compatible isoblock is found, that translation is executed 1211.

If the successor profiling metric exceeds the group block trigger threshold, then a new group block is created 1213 and executed 1211, as discussed above, even if a compatible isoblock exists.

If the basic block does not return any isoblocks, or none of the isoblocks returned are compatible, then the current block is translated 1217 into an isoblock specialized on the current working conditions, as discussed above. At the end of decoding $BB_N$, if the successor of $BB_N$ ($BB_{N+1}$) is statically determinable 1219, then an extended basic is created 1215. If an extended basic block is created, then $BB_{N+1}$ is translated 1217, and so forth. When translation is complete, the new isoblock is stored in the basic block cache 1221 and then executed 1211.

Partial Dead Code Elimination

Figure 9:
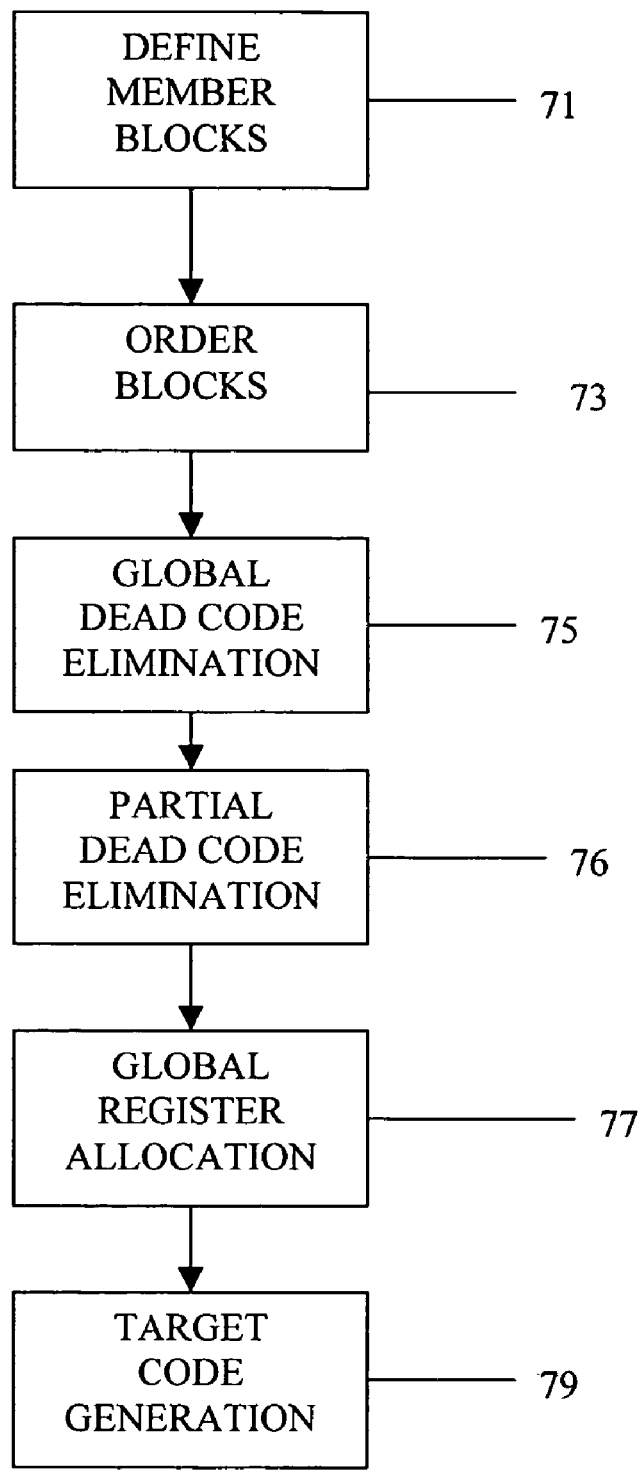
FIG. 9 is flow diagram illustrating another preferred embodiment of group blocking and attendant optimizations.

In an alternative embodiment of the translator, after all of the register definitions have been added to the traversal array and after the stores are added to the array and after the successor has been processed, essentially after the IR has been completely traversed, a further optimization may be applied to the group block, referred to herein as "partial dead code elimination" and shown in step 76 of FIG. 9. Such partial dead code elimination employs another type of liveness analysis. Partial dead code elimination is an optimization in the form of code motion applied in the group block mode for blocks ending in non-computed branches or computed jumps.

In the embodiment illustrated in FIG. 9, the partial dead code elimination step 76 is added to the group block construction steps described in connection with FIG. 6, where partial dead code elimination is performed after the global dead code elimination step 75 and prior to the global register allocation step 77.

As described previously, a value, such as a subject register, is said to be "live" for the range of code starting with its definition and ending with its last use prior to being re-defined (overwritten), where the analysis of values' uses and definitions is known in the art as liveness analysis. Partial dead code elimination is applied to blocks ending in both non-computed branches and computed jumps.

Figure 10A:
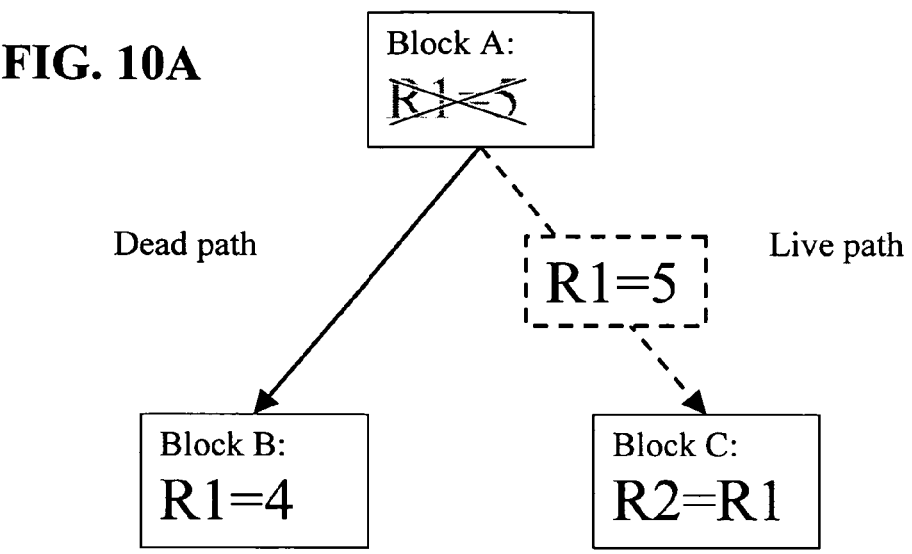
FIGS. 10A-10B are schematic diagrams showing an example illustrating partial dead code elimination optimization.

For a block that ends in a non-computed two-destination branch, all register definitions in that block are analyzed to identify which of those register definitions are dead (redefined before being used) in one of the branch destinations and live in the other branch destination. Code can then be generated for each of those definitions at the start of its live path rather than within the block's main code as a code motion optimization technique. Referring to FIG. 10A, an example illustrating the live and dead paths of a two-destination branch is provided for assisting in understand the register definition analysis performed. In Block A, the register R1 is defined as R1=5. Block A then ends in a conditional branch, branching to Blocks B and C. In Block B, the register R1 is redefined to R1=4 prior to using the value (R1=5) defined for R1 in Block A. Thus, Block B is identified as a dead path for register R1. In Block C, the register definition R1=5 from Block A is used in the definition of register R2 prior to redefining register R1, thus rendering the path to Block C a live path for register R1. The register R1 is shown to be dead in one of its branch destinations but live in the other of its branch destinations, so register R1 is identified as a partially dead register definition.

Figure 10B:
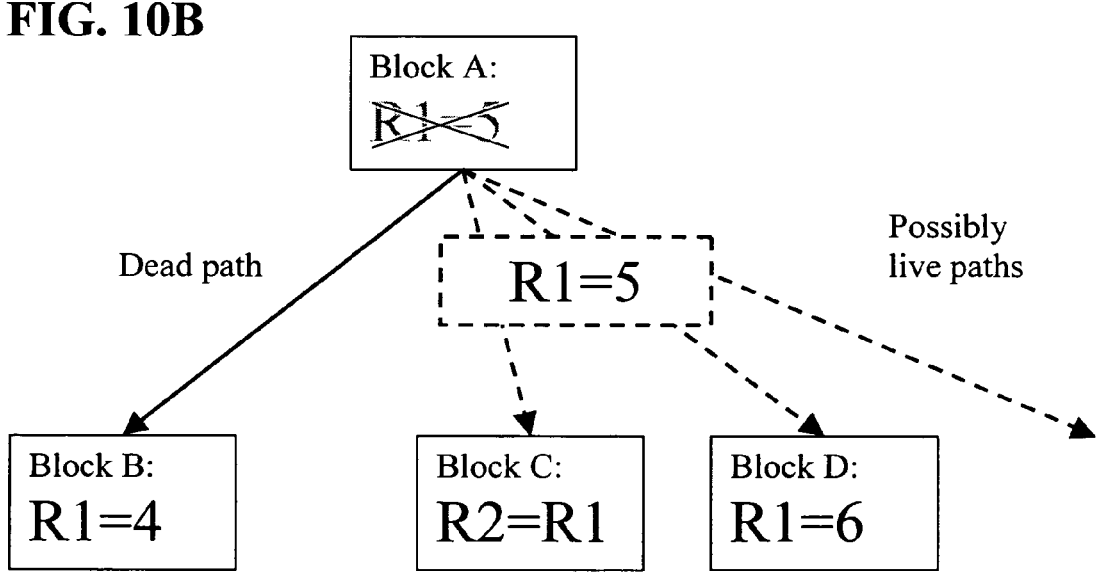

The partial dead code elimination approach used for non-computed branches can also be applied for blocks that can jump to more than two different destinations. Referring to FIG. 10B, an example is provided for illustrating register definition analysis performed to identify the dead paths and the possibly live paths of a multiple-destination jump. As above, the register R1 is defined in Block A as R1=5. Block A can then jump to any of Blocks B, C, D, etc. In Block B, the register R1 is redefined to R1=4 prior to using the value (R1=5) defined for R1 in Block A. Thus, Block B is identified as a dead path for register R1. In Block C, the register definition R1=5 from Block A is used in the definition of register R2 prior to redefining register R1, thus rendering the path to Block C a live path for register R1. This analysis is continued for each of the paths for the various jumps to determine if the path is a dead path or a possibly live path.

If a register definition is dead for the hottest (most executed) destination, the code for only the other paths can be generated instead. Some of the other possibly live paths may turn out to be dead as well, but this partial dead code elimination approach is efficient for the hottest path, since all other destinations need not be investigated. The remaining discussion of the partial dead code elimination approach of step 76 of FIG. 9 will mostly be described with reference to conditional branches only, since it is understood that partial dead code elimination for computed jumps can simply be extended from the solution for conditional branches.

Figure 11:
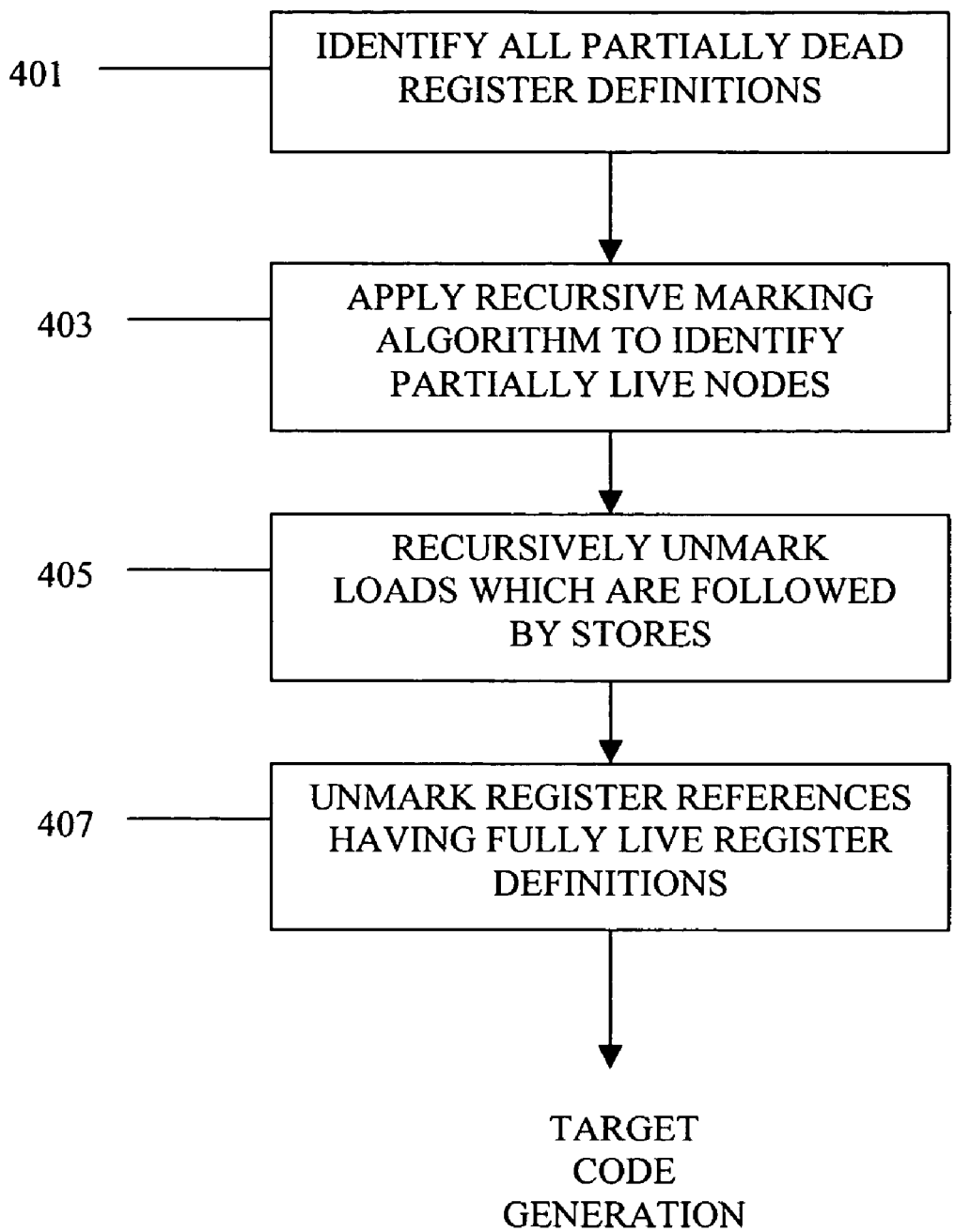
FIG. 11 is a flow diagram illustrating partial dead code elimination optimization.

Referring now to FIG. 11, a more specific description of a preferred method of implementing the partial dead code elimination technique is illustrated. As described, partial dead code elimination requires liveness analysis, where all partially dead register definitions for a block ending in a non-computed branch or computed jump are initially identified in step 401. In order to identify whether a register definition is partially dead, the successor blocks (which may even include the current block) of the branch or jump are analyzed to determine if the liveness status for that register in each of its successors. If the register is dead in one successor block but not dead in another successor block, then the register is identified as a partially dead register definition. The identification of partially dead registers occurs after the identification of fully dead code (where the register definition is dead in both successors) performed in the global dead code elimination step 75. Once identified as a partially dead register, the register is added to a list of partially dead register definitions to be used in a subsequent marking phase.

Once the set of partially dead register definitions has been identified, a recursive marking algorithm 403 is applied to recursively mark the child nodes (expressions) of each of the partially dead registers to achieve a set of partial dead nodes (i.e., a set of register definitions and child nodes of those definitions that are partially dead). It should be noted that each child of a partially dead register definition is only possibly partially dead. A child can only be classified as partially dead if it is not shared by a live register definition (or any type of live node). If a node turns out to be partially dead, then it is determined if its children are partially dead, and so on. This provides a recursive marking algorithm that ensures that all referees to a node are partially dead before identifying the node as partially dead.

Thus, for the purposes of the recursive marking algorithm 403, rather than storing whether an individual reference is partially dead, it is determined whether all references to a node are partially dead. As such, each node has a deadCount (i.e, the number of references to this node that come from partially dead parent node) and a refCount (the total number of references to this node). The deadCount is incremented each time it is marked as possibly partially dead. The deadCount of a node is compared to its refCount, and, if these two become equal, then all references to that node are partially dead and the node is added to the list of partially dead nodes. The recursive marking algorithm is then applied to the children of the node just added to the list of partially dead nodes until all partially dead nodes have been identified.

The recursive marking algorithm applied in step 403 may preferably occurs in a buildTraversalArray( ) function, just after all register definitions have been added to the traversal array and before the stores are added to the array. For each register in the list of partially dead register definitions, a recurseMarkPartialDeadNode( ) function is called with two parameters: the register definition node and the path it is live on. The nodes for the register definition which are dead (i.e., in a dead path) are ultimately discarded, and the register definitions for partially live paths are moved into one of the paths of the branch or jump, creating separate lists of partially live nodes. Two lists are created in the case of a conditional branch, one for the 'true path' followed if the condition evaluates to true and one of the 'false path' followed if the condition evaluates to 'false.' These paths and nodes are referred to as "partially live" instead of "partially dead," since the nodes for the path on which they are dead are discarded and only the nodes are retained for the path on which the nodes are live. To provide this capability, each node may include a variable which identifies which path the node is live for. The following pseudo-code is performed during the recurseMarkPartialDeadNode( ) function:

---

IF node's deadCount is 0
    Set path variable to match path parameter
ELSE IF path variable does not match path parameter
    Return (since a node that is partially live in both lists is actually fully live)
Increment deadCount
IF deadCount matches refCount
    Add node to partially live list for its path variable
    Invoke recurseMarkPartialDeadNode for each of its children (using same path)

---

Once a recurseMarkPartialDeadNode( ) function has been called for each of the partially dead register definitions contained in the set of partially dead register definitions, there will exist three sets of nodes. The first set of nodes contains all fully live nodes (i.e., those with a refCount higher than their deadCount) and the other two sets contain the partially live nodes (i.e. those with a refCount that matches their dead- Count) for each path of the conditional branch. It is possible that any of these three sets could be empty. As a form of optimization, code motion is applied where code for the partially live nodes is delayed from being planted until after the code for the fully live nodes has been planted.

Due to ordering restrictions, it is not always possible to perform code motion on all of the partially live nodes which are found in step 403. For instance, it is not allowable to move a load if it is followed by a store, since the store may overwrite the value that the load retrieves. Similarly, a register reference cannot be code motioned if a register definition to that register is fully live, since the register definition will overwrite the value in the subject register bank that is used to generate the register reference. Therefore, all loads which are followed by a store are recursively unmarked in step 405, and all register references that have a correspondingly fully live register definition are unmarked in step 407.

With respect to the loads and stores unmarked in step 405, it should be noted that when the intermediate representation is initially built, before the collection of partially dead nodes, it possesses an order in which the loads and stores must be performed. This initial intermediate representation is used in a traverseLoadStoreOrder( ) function to impose dependencies between loads and stores to ensure that memory accesses and modifications occur in the proper order. In order to illustrate this feature in a simple example, where there is a load followed by a store, the store is made dependent on the load to show that the load must be performed first. When implementing the partial dead code elimination technique, it is necessary to unmark the load and its children nodes to ensure that it is generated before the store is. A recurseUnmarkPartialDeadNode( ) function is used to achieve this unmarking.

Step 405 of the partial dead code elimination technique may alternatively further provide optimization for load-store aliasing information. Load store aliasing filters out all of the situations where consecutive load and store functions access the same addresses. Two memory accesses (e.g., a load and a store, two loads, two stores) alias if the memory addresses they use are the same or overlap. When a consecutive load and store are encountered during the traverseLoadStoreOrder( ) function, they either definitely do not alias or they possibly alias. In the case where they definitely do not alias, there is no need to add the dependency between the load and the store, thus eliminating the need to also unmark the load. Load-store aliasing optimization identifies situations where two accesses definitely alias and removes redundant expressions accordingly. For example, two store instructions to the same address are not required if there is no intervening load instruction, since the second store will overwrite the first store.

With respect to the register references unmarked in step 407, this aspect is important when code generation strategy requires a register reference to be generated before a register definition of that same register. This results from the register reference representing the value that the register possesses at the start of the block, such that performing the register definition first will overwrite that value before it is read and leave the register reference with the wrong value. As such, a register reference cannot be code motioned if there is a corresponding fully live register definition. To account for this situation, it is determined if such cases exists using a traverseRegDefs( ) function and any register references that fall into this category are unmarked in step 407.

After the sets of live and partially live nodes have been generated and respectively unmarked as appropriate, target code must then be generated for these nodes. When the partial dead code elimination technique is not utilized, the code for each node in the intermediate representation is generated in a loop within a traverseGenerate( ) function, where all nodes except the successor were generated when they were considered ready, namely their dependencies had been satisfied, with the successor being done last. This becomes more complicated when partial dead code elimination is implemented, because there are now three sets of nodes (the fully live set and the two partially live sets) from which to generate code. In the case of conditional jumps, the number of sets of nodes will increase respectively with the number of computed jumps. The successor node is guaranteed to be live, so code generation begins with all fully live nodes and is followed by the successor nodes, with code motion being applied to generate the partially live nodes afterwards.

The order for generating the code for the partially live nodes depends upon the locations of the successors of the particular branches in the non-computed branches, depending on whether none, one or both of the branches successors are also in the group block from where the branch occurs. As such, there are three different functions that require code for generating partially dead code for non-computed branches.

The code planted for a block that ends in a non-computed branch, with neither successor being in the same group block, is generated according to the order in the following Table 3:

TABLE 3

| Order | Code Planted |
| --- | --- |
| A | Fully Live Code |
| B | Successor Code (Branch to E if true) |
| C | Partially Live Code for False |
| D | GroupBlockExit (to False Destination) |
| E | Partially Live Code for True |
| F | GroupBlockExit (to True Destination) |

The instructions planted in section A cover all of the instructions required for the fully live nodes. If partial dead code elimination is turned off, or if no partially dead nodes could be found, the fully live nodes from section A will represent all of the IR nodes for the block (except the successor). The instructions planted in section B implement the functionality of the successor node. The code generation path will then either fall through to C (if the branch condition is 'false') or jump to E (if the branch condition is 'true'). Without implementation of partial dead code elimination, the instructions planted in section D would immediately follow the successor code. However, when implementing partial dead code elimination, the partially live nodes for the false path need to be executed before a jump to the false destination occurs. Similarly, without partial dead code elimination, the address of the first instruction generated in section F would have normally been the destination of the successor when the condition was true, but, when implementing partial dead code elimination, the partially live nodes for the true path in section E must first be executed.

When both successor branches are in the same group block, synchronization code may need to be generated. A number of factors may influence the order in which code is planted when both successors are in the same group block, such as whether each successor has been translated yet or which successor has the higher execution count. The code planted when both successors are in the same group block will generally be same as described above when neither successor is in the group block, except that partially live nodes must now be generated before the synchronization code (if any) is generated. The code planted for a block that ends in a non-computed branch, with both successors being in the same group block, is generated according to the order in the following Table 4:

TABLE 4

| Order | Code Planted |
|---|---|
| A | Fully Live Code |
| B | Successor Code (Branch to F if true) |
| C | Partially Live Code for False |
| D | Synchronization Code |
| E | Branch Internally |
| F | Partially Live Code for True |
| G | Synchronization Code |
| H | Branch Internally |

When one of the successor branches of the non-computed branch is in the same group block and the other successor branch is external to the group block, the partially live code for the nodes within the same group block is handled as described above in connection with when both successors are in the same group block.

For the external successor, the partially live code for the external successor will sometimes be planted inline before the GroupBlockExit and sometimes in the group block's epilogue section. The partially live code that is meant to be in the epilogue is generated inline and then copied to a temporary area in the epilogue object. The instruction pointer is reset and the state is restored afterwards, to allow the code that should go inline to write over it. When the times comes to generate the epilogue, the code is copied from the temporary area and into the epilogue in the appropriate place.

In order to implement the code generation for the partially dead nodes, a nodeGenerate( ) function, which has the same functionality as the loop in traverseGenerate( ), is utilized to generate each of the three sets of nodes. To ensure that the correct set is generated each time, the nodeGenerate( ) function ignores nodes that have a deadCount that matches their refCount. Accordingly, the first time the nodeGenerate( ) is called (from traverseGenerate( )) only the fully live nodes are generated. Once the successor code has been generated, the two sets of partially live nodes can be generated by setting their deadCounts to zero just before nodeGenerate( ) is called again.

Lazy Byteswapping Optimization

Another optimization implemented in a preferred embodiment of the translator 19 is "lazy" byteswapping. According to this technique, optimization is achieved by preventing consecutive byteswap operations within an intermediate representation (IR) of a basic block from being performed, such that consecutive byteswap operations are optimized away. This optimization technique is applied across basic blocks within a group block so that byteswap operations are delayed and are only applied at the time when the byteswapped values are to be used.

Byteswapping refers to the switching of the positions of the bytes within a word so as to reverse the order of the bytes in the word. In this manner, the positions of the first byte and the last byte are switched and the positions of the second byte and the second-to-last byte are switched. Byteswapping is necessary when words are used on a big-endian computing environment which were created for a little-endian computing environment or vice versa. Big-endian computing environments store words in memory in MSB order, meaning that the most significant byte of a word has the first address. Little-endian computing environments store words in memory in LSB order, meaning that the least significant byte of a word has the first address.

Any given architecture is either little or big-endian. Therefore, for any given subject/target processor architecture pairing for the translator, it must be determined when a particular translator application is being compiled whether the subject processor architecture and the target processor architecture possess the same endian-ness. The data is arranged in memory in subject-endian format for the subject processor architecture to understand. Thus, in order for the target-endian processor architecture to understand the data, the target processor architecture must either have the same endian-ness as the subject processor architecture or, if different, any data which is loaded from or stored to memory must be byteswapped to the target-endian format. If the endian-ness of the subject processor architecture and the target processor architecture are different, the translator must invoke byteswapping. For instance, in the situation where the subject and target processor architecture are different, when reading a particular word of data out of memory, the ordering of the bytes must be switched before performing any operations such that the bytes are in the order the target processor architecture would expect. Similarly, where there is a particular word of data which has been calculated and needs to be written out to memory, the bytes must be swapped again to put them in the order expected by the memory.

Lazy byteswapping refers to a technique performed by the present translator 19 of delaying a byteswap operation from being performed on a word until the value is actually being used. By delaying the byteswap operation on a word until its value is actually utilized, it can be determined if consecutive byteswap operations are present in the IR of a block and thus can be eliminated from the target code which is generated. Performing a byteswap twice on the same word of data yields no net effect and merely reverses the order of the bytes of the word twice, thus returning the order of the bytes in the word back to their original order. Lazy byteswapping allows an optimization to be performed of removing consecutive byteswap operations from the IR, thus eliminating the need to generate target code for these consecutive byteswap operations.

As described previously in connection with the generation of the IR tree by the translator 19, when generating the IR of a block, each register definition is a tree of IR nodes. Each node is known as an expression. Each expression potentially has a number of children nodes. For the purposes of providing a simple example of these terms, if a register is defined as '3+4', its top level expression is a '+', which has two children, namely a '3' and a '4.' The '3' and '4' are also expressions, but they have no children. A byteswap is a type of expression that has one child, namely the value which is to be byteswapped.

Figure 12:
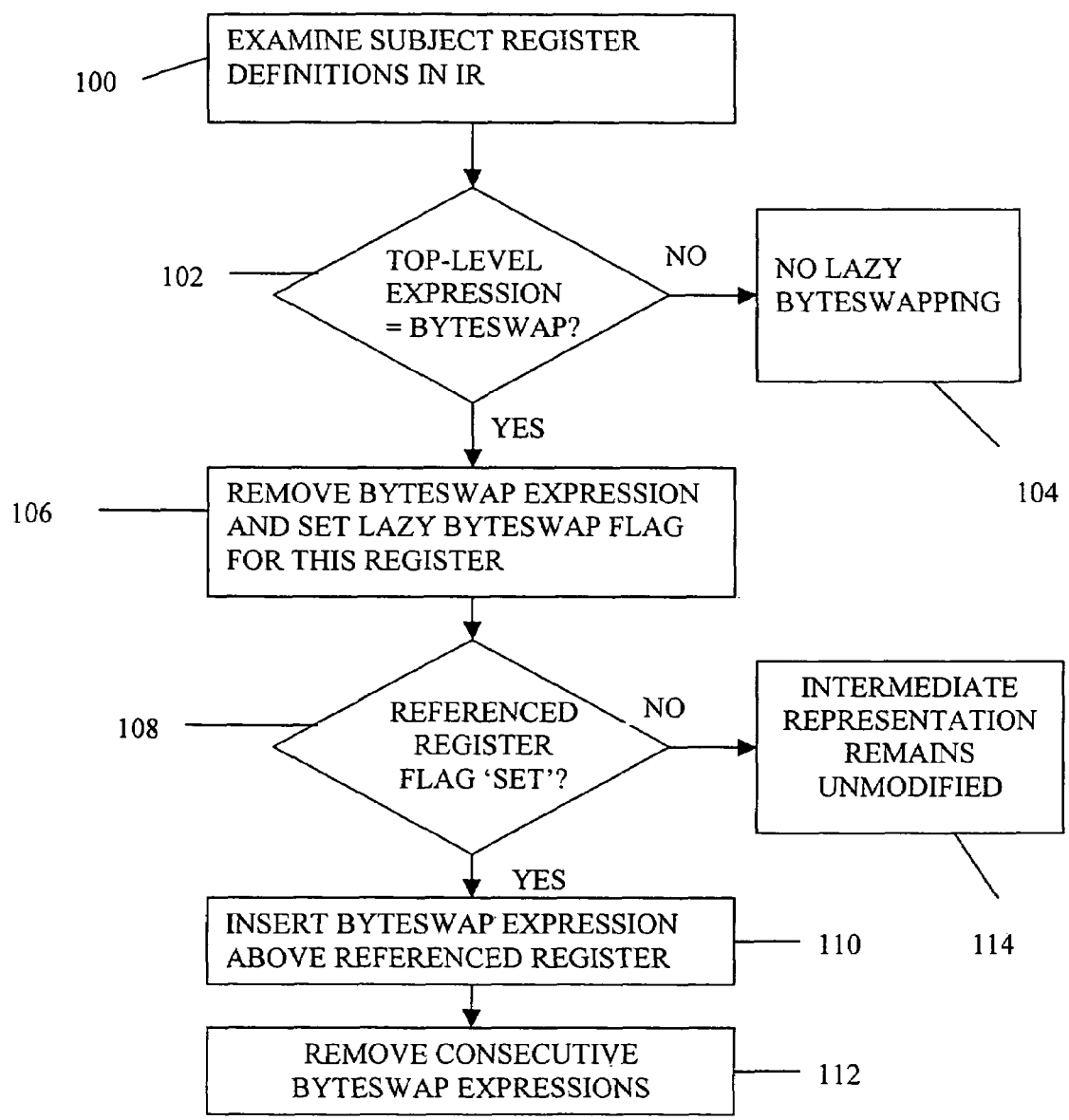
FIG. 12 is a flow diagram illustrating lazy byteswapping optimization.

With reference to FIG. 12, a preferred method for employing the lazy byteswapping optimization technique is illustrated. When in group block mode, the IR of a block is examined in step 100 to locate each subject register definition, where, for each subject register definition, it is determined if its top-level expression is a byteswap in step 102. Lazy byteswapping optimization is not applied to subject register definitions which do not possess a byteswap operation as its top-level expression (step 104). If the top-level expression is a byteswap, then the byteswap expression is removed from the IR in step 106 and a lazy byteswap flag for this register is set. The indication that the byteswap is removed essentially refers to the register being redefined to be the child of the byteswap with the byteswap expression being discarded. This results in the value defined to this register being in the opposite byte order as expected. It must be remembered that this is the case, because a byteswap must be performed before the value in the register can properly be used.

In order provide indication that the byteswap expression has been removed and that value defined to this register is in the opposite byte order as expected, a lazy byteswap flag is set for that register. There is a flag, i.e. a Boolean value, associated with each register, describing whether the value in that register is in the correct byte order or the opposite byte order. When a value in a register is desired to be used and that register's lazy byteswap flag is set (i.e., the flag's Boolean value is toggled to 'true'), the value in the register must first be byteswapped before it can be used. By applying this optimization illustrated in FIG. 12, byteswap expressions are removed from the IR in a way that the byteswap operations can be delayed until the value in the register is actually used. The semantics of this optimization allow byteswaps to be delayed at the point they are loaded from memory until the point where values are actually used. If the point when the values are used happens to be a store back to memory, a savings is provided from the optimization resulting from two consecutive byteswaps being able to be removed.

Once a register that has its lazy byteswap flag set as 'true' is referenced, the IR must be modified to insert a byteswap expression above the referenced expression in the IR of the block: If another byteswap expression is adjacent to the inserted byteswap expression in the IR, an optimization is applied to prevent either byteswap operation from being generated in the target code.

Whenever a new value is stored to a register, the lazy byteswap state of that register is then cleared, meaning that the Boolean value for the lazy byteswap flag for that register is set to 'false.' When the lazy byteswap flag is set to 'false,' a byteswap does not need to be performed before the value in the register is used, since the value in the register is already in the correct byte order expected by the target processor architecture. A 'false' lazy byteswap state is the default state for all register definitions, such that flags should be set to reflect this default state whenever a register is defined.

The lazy byteswap state is the set of all lazy byteswap flags for each of the registers in the IR. At any given time, registers will either be 'set' (their Boolean value being 'true') or 'cleared' (their Boolean value being 'false') to indicate the current state of each of the registers. The exit state of a given block within a group block (i.e., the set of lazy byteswap flags) is copied as the entry state for the next block within a hot path through the group block. As described in detail hereinabove, a group block consists of a collection of basic blocks which are connected together in some way. When a group block is executed, a path through the different basic blocks is followed with each basic block being executed in turn until exiting the group block. For a given group block, there may be a number of possible execution paths through its various basic blocks, where a so-called 'hot path' is the path followed most frequently through the group block. The 'hot path' is preferably favored over the other paths through the group block when optimization is performed due to its frequent usage. To this end, when a group block is generated, the blocks along the 'hot path' are generated 'first', setting the entry byteswap state of each block in the hot path to equal the exit state of the previous block in the hot path.

In the situation where one of the valid paths loops back to a basic block having code for that block which has already been generated, it must be ensured that the current lazy byteswap state of the registers is as this code expects before this generated code is simply executed. This precondition is encoded in the entry lazy byteswap state for that block by planting synchronization code between the blocks on colder paths. Synchronization is the act of moving from the exit state of a current basic block to the entry state of the next block. For each register, the lazy byteswap flags must be examined between blocks to determine if they are the same. Nothing is required to be done if the lazy byteswap flags are the same, whereas, if different, the value currently that register must be byteswapped.

When returning from group block mode to basic block mode, the lazy byteswap state is rectified. Rectification is the synchronization from the current state to a null state where all lazy byteswap flags are cleared as group block mode is exited.

The lazy byteswapping optimization can also be utilized for loads and stores in floating point registers, which results in even greater savings from the optimization due to the expense of floating point byteswaps. In the situation where single precision floating point numbers are required by the code to be loaded, the single-precision floating point loads must be byteswapped and then immediately converted to a double precision number. Similarly, the reverse conversion must be performed whenever the code requires a single precision number to be later stored. To account for these situations for floating point stores and loads, an extra flag in the compatibility tag for each floating point register is provided, allowing both the byteswap and the conversion to be lazily performed (i.e., delayed until the value is required).

When a lazily byteswapped register is referenced, such that a byteswap operation is planted above the referenced register as described above, a further optimization is to write the byteswapped value back to the register and to clear the lazy byteswap flag. This type of optimization, referred to as a writeback mechanism, is effective when the contents of a register are repeatedly used. The purpose of implementing the lazy byteswapping optimization is to delay the actual byteswapping operation until it is necessary to use the value, where this delay is effective in reducing target code if the value in the register is never utilized or if consecutive byteswap operations can be optimized away. However, once the contents of the register are actually used, the byteswap operation which had been delayed must then be performed and the savings provided by lazy byteswapping no longer exist. Furthermore, when lazy byteswapping optimization has already been implemented and if the value in the register is repeatedly used in multiple subsequent blocks, then the value in the register would have the wrong-endian value and would need a byteswap operation planted before each use, thus requiring multiple byteswap operations. This could lead to inefficient target code that performs worse than if lazy byteswapping optimization had not been implemented.

In order to avoid this inefficient target code generation which could result from multiple byteswap operations being performed on the same register value, the lazy byteswapping optimization further includes a writeback mechanism for redefining a register to its target-endian value as soon as a first byteswap operation is required to be performed on the value in the register, such that the byteswapped value is written back to the register. The lazy byteswap flag for this register is also cleared at this time to signify that the register contains its expected target-endian value. This results in the register being in its rectified target-endian state for each of the subsequent blocks, and the overall target code efficiency is the same as if the lazy byteswapping optimization had never been applied. In this way, lazy byteswapping optimization always results in target code being generated which is at least as efficient, if not more so, than target code generated without implementing lazy byteswapping optimization.

Figures 13A, 13B:
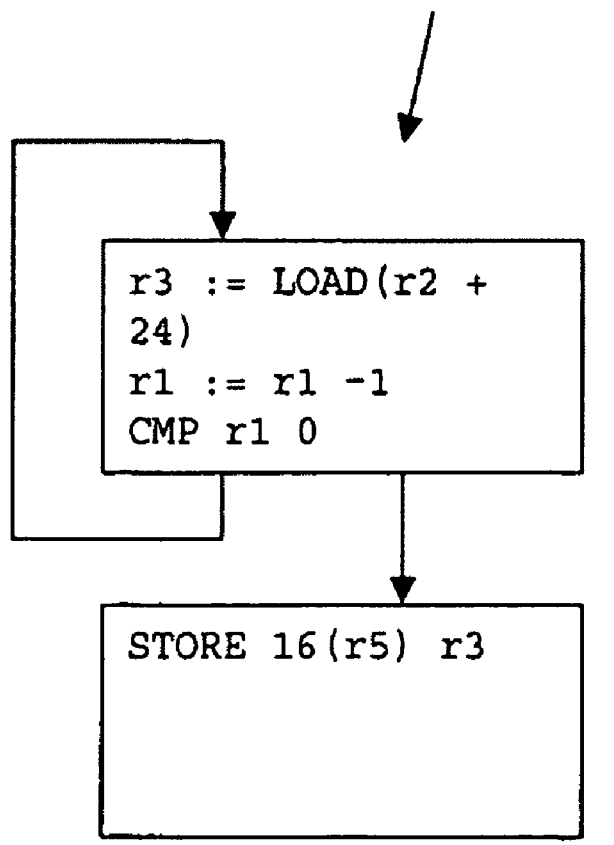
FIGS. 13A-13F are schematic diagrams showing an example illustrating lazy byteswapping optimization.
Figure 13C:
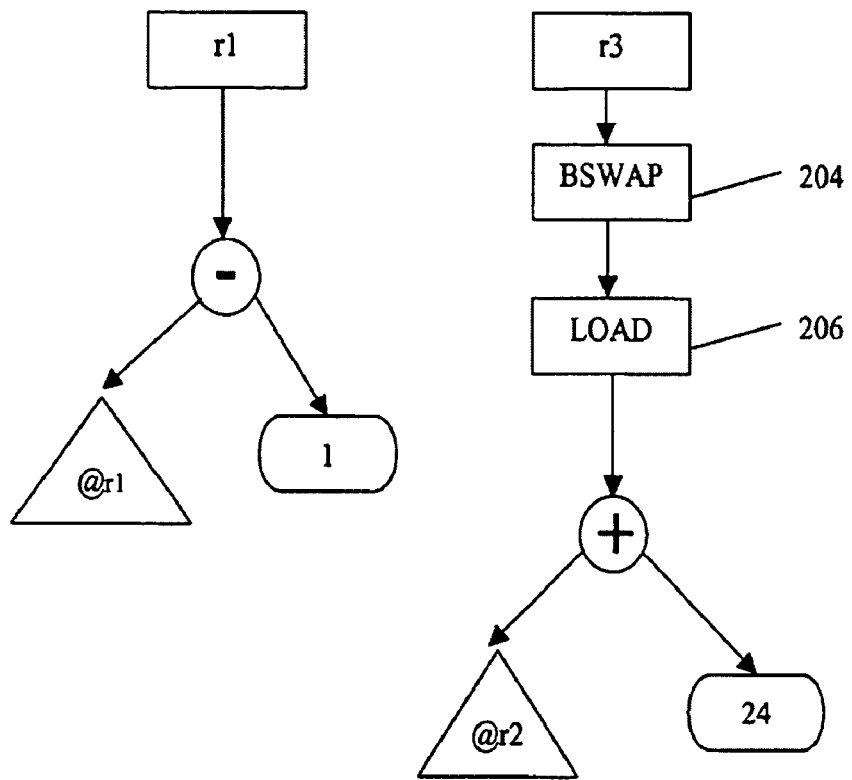
Figure 13D:
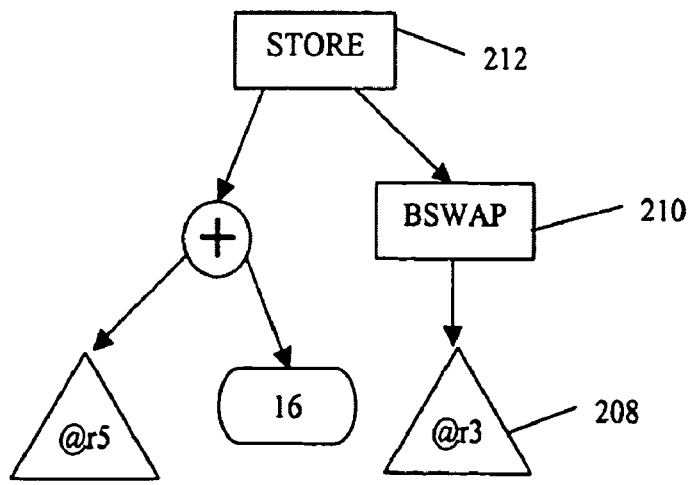

FIGS. 13A-13F provide an example of lazy byteswapping optimization as described above. The subject code 200 is shown in FIG. 13A of the example as pseudo-code rather than machine code from any particular architecture in order to simplify the example. The subject code 200 describes looping round a number of times, loading a value into register r3, and then storing that value back out. A group block 202 is generated to include two basic blocks, Block 1 and Block 2, illustrated in FIG. 13B. Without implementing the lazy byteswapping mechanism, the intermediate representation (IR) generated for the two basic blocks would appear as shown in FIG. 13C and FIG 13D. For simplicity, the IR for setting the condition register based on register r1 is not shown in this diagram.

Figures 13E, 13F:
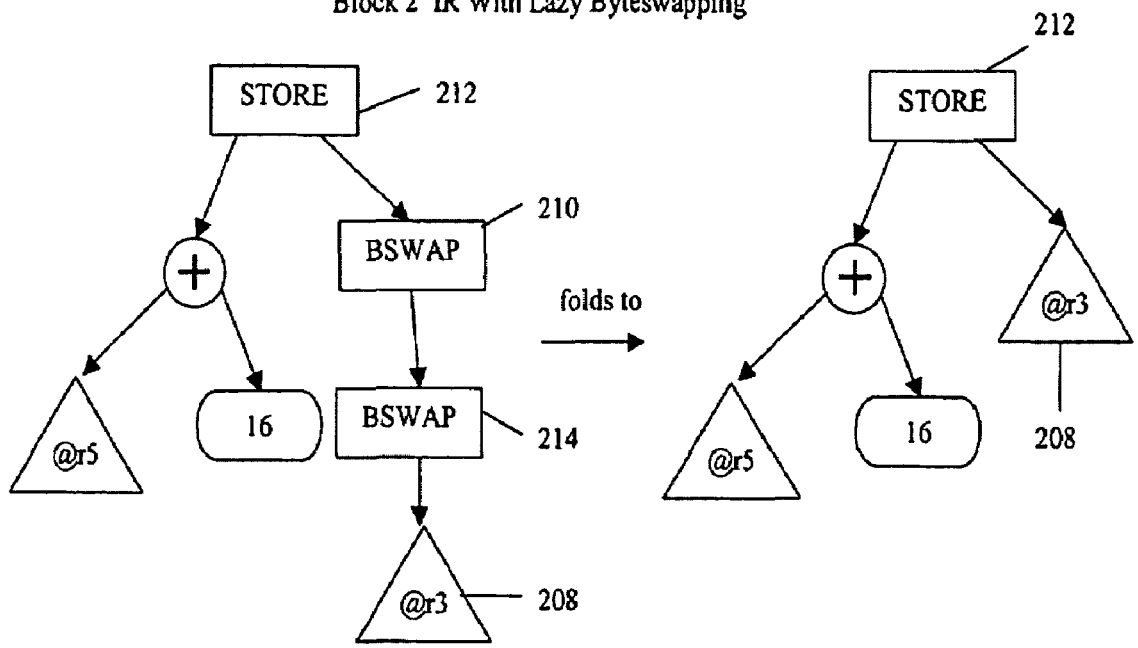

Once the IR for Blocks 1 and 2 have been created, the register definition list is examined looking for byteswaps as the top-level node of the definition. In doing so, it would be discovered that the top-level node 204 for register r3 has been defined as a byteswap (BSWAP). The definition of register r3 is altered to be that of the child of the byteswap node 204, namely the LOAD node 206, where it must be remembered that lazy byteswapping has been invoked. In the IR for Block 2, it can be seen that register r3 is referenced by node 208. Since lazy byteswapping has been invoked in the definition of register r3, a byteswap must be planted above this reference before it can be used, as shown by the inserted byteswap (BSWAP) node 214 in FIG. 13E. In this situation, there are now two consecutive byteswaps, BSWAP node 210 and BSWAP node 214 appearing in the IR for Block 2. Lazy byteswapping optimizations would then fold both of these byteswaps 210 and 214 away such that the byteswap expression would be removed from the IR for both Block 1 and Block 2, as shown in FIG. 13E and 13F. As a result of this lazy byteswapping optimization, the byteswap 204 on the LOAD node 206 (which is in a loop and would be executed multiple times) and the byteswap 210 associated with the store node 212 in Block 2 would be removed from the IR, thus achieving great savings by eliminating these byteswap operations from being generated into target code.

Interpreter

Figure 14:
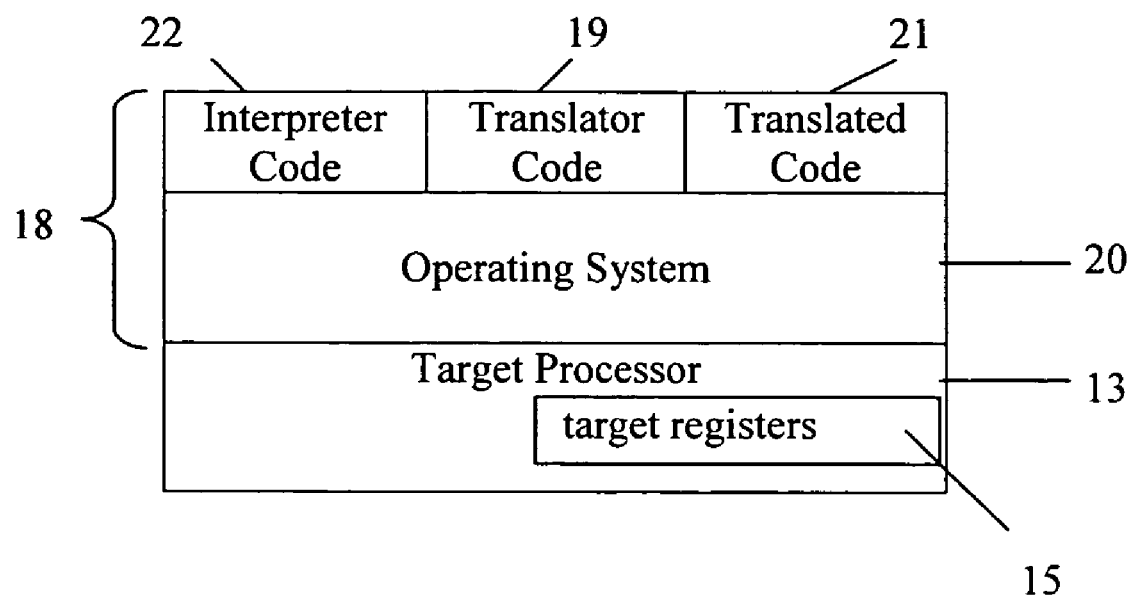
FIG. 14 is a block diagram of apparatus wherein embodiments of the invention find application.

Another illustrative apparatus for implementing various novel interpreter features in conjunction with translator features is shown in FIG. 14. FIG. 14 illustrates a target processor 13 including target registers 15 together with memory 18 storing a number of software components 19, 20, 21 and 22. The software components include the translator code 19, the operating system 20, the translated code 21 and the interpreter code 22. It should be noted that the apparatus illustrated in FIG. 14 is substantially similar to the translator apparatus illustrated in FIG. 1, except that additional novel interpreter functions are added by the interpreter code 22 in the apparatus of FIG. 14. The components of FIG. 14 function identically to their similarly numbered components described with respect to FIG. 1, such that a description of these similarly numbered components will be omitted from the description of FIG. 14 as being unnecessarily repetitive. The discussion of FIG. 14 below will focus on the additional interpreter functions provided.

As described in detail above, when attempting to execute subject code 17 on the target processor 13, the translator 19 translates blocks of subject code 17 into translated code 21 for execution by the target processor 13. In certain situations, it may be more beneficial to interpret portions of the subject code 17 to execute them directly without first translating the subject code 17 into translated code 21 for execution. Interpreting the subject code 17 can save memory by eliminating the need to store the translated code 21 and further improve latency figures by avoiding delays caused from awaiting for subject code 17 to be translated. Interpreting subject code 17 is typically slower than simply running the translated code 21, because the interpreter 22 must analyze each statement in the subject program each time it is executed and then perform the desired action whereas the translated code 21 just performs the action. This run-time analysis is known as "interpretive overhead." Interpreting code is especially slower than translating code for portions of subject code which are executed a large number of times, such that the translated code could be reused without requiring translation each time. However, interpreting subject code 17 can be faster than the combination of both translating the subject code 17 into translated code 21 and then running the translated code 21 for portions of subject code 17 which are executed only a small number of times.

In order to optimize the efficiency of running subject code 17 on the target processor 13, the apparatus embodied in FIG. 14 utilizes a combination of an interpreter 22 and a translator 19 to execute respective portions of the subject code 17. A typical machine interpreter supports an entire instruction set of that machine along with input/output capabilities. However, such typical machine interpreters are quite complex and would be even more complex if required to support the entire instruction set of a plurality of machines. In a typical application program embodied in subject code, a large number of blocks of subject code (i.e., basic blocks) will utilize only a small subset of the instruction set of a machine on the subject code is designed to be executed.

Therefore, the interpreter 22 described in this embodiment is preferably a simple interpreter which supports only a subset of the possible instruction set for the subject code 17, namely supporting the small subset of the instructions utilized over a large number of basic blocks of subject code 17. The ideal situation for utilizing the interpreter 22 is when the majority of the basic blocks of subject code 17 which can be handled by the interpreter 22 are executed only a small number of times. The interpreter 22 is particularly beneficial in these situations, because a large number of blocks of subject code 17 never have to be translated by the translator 19 into translated code 21.

Figure 15:
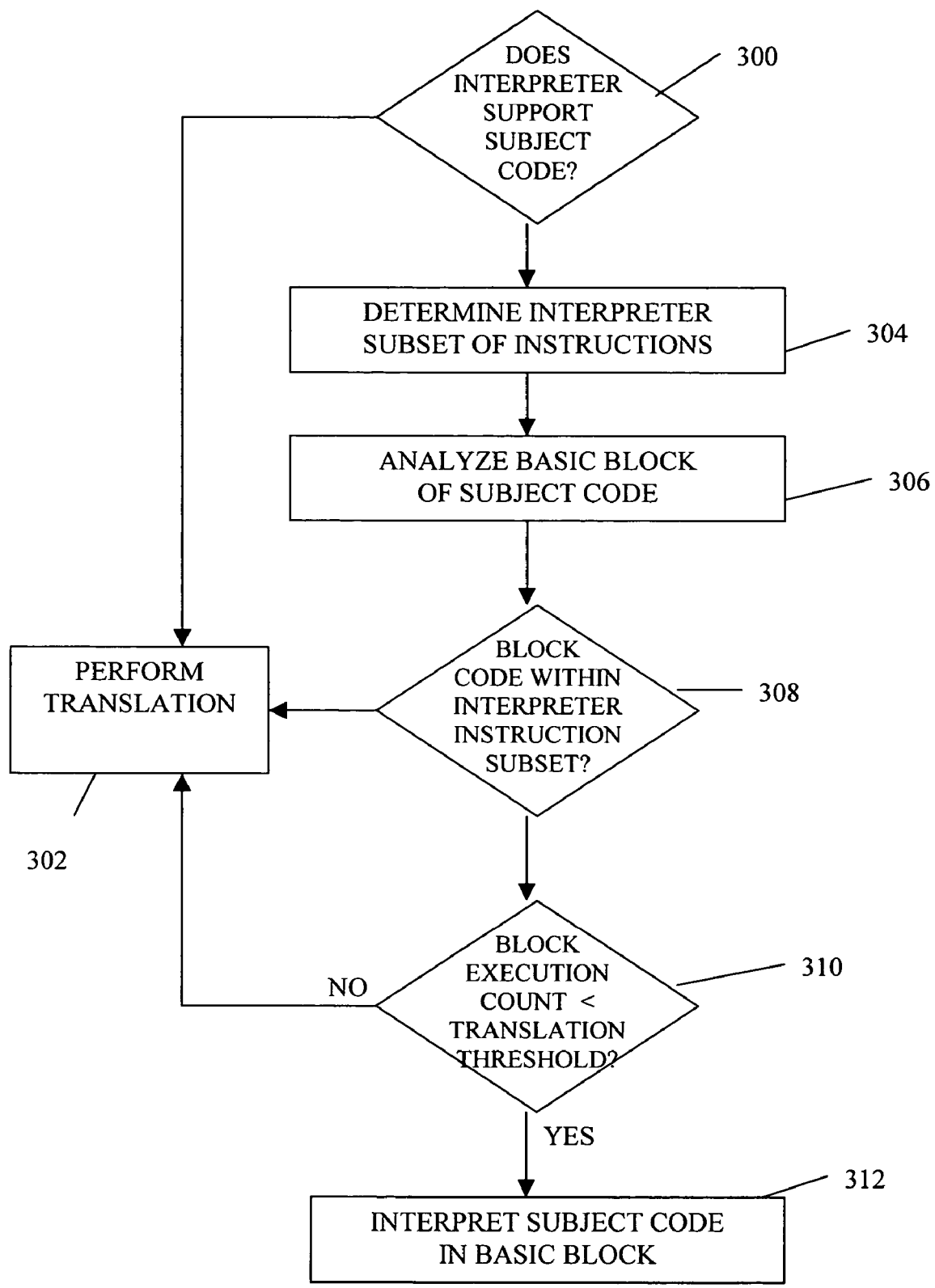
FIG. 15 is a flow diagram illustrating an interpreting process.

FIG. 15 provides a illustrative method by which the apparatus of FIG. 14 determines whether to interpret or translate respective portions of the subject code 17. Initially, when analyzing the subject code 17, it is determined in step 300 whether the interpreter 22 supports the subject code 17 to be executed. The interpreter 22 may be designed to support subject code for any number of possible processor architectures, including but not limited to PPC and X86 interpreters. If the interpreter 22 fails to support the subject code 17, the subject code 17 is translated in step 302 by the translator 19 as described above in association with the other embodiments of the present invention. In order to allow the interpreter 22 to function equivalently for all types of subject code 17, a Null-Interpreter (i.e., an interpreter that does nothing) can be used for unsupported subject code so that unsupported subject code does not have to be treated specially. For subject code 17 which is supported by the interpreter 22, a subset of the subject code instruction set to be handled by the interpreter 22 is determined in step 304. This subset of instructions enables the interpreter 22 to interpret most of the subject code 17. The manner of determining the subset of instructions supported by the interpreter 22, referred to hereafter as the interpreter subset of instructions, will be described in greater detail hereinafter. The interpreter subset of instructions may include instructions directed toward a single architecture type or may cover instructions extending over a plurality of possible architectures. The interpreter subset of instructions will preferably be determined and stored before the actual implementation of the interpreting algorithm of FIG. 15, where the stored interpreter subset of instructions is more likely to be retrieved in step 304.

Blocks of subject code are analyzed one block at a time in step 306. It is determined in step 308 whether a particular block of subject code 17 contains only instructions within the subset of instructions supported by the interpreter 22. If the instructions in the basic block of subject code 17 are covered by the interpreter subset of instructions, then the interpreter 22 determines in step 310 whether the execution count for this block has reached a defined translation threshold. The translation threshold is selected as the number of times that the interpreter 22 can execute a basic block before it becomes less efficient to interpret the block than to translate the basic block. Once the execution count reaches the translation threshold, the block of subject code 17 is translated by translator 19 in step 302. If the execution count is less than the translation threshold, the interpreter 22 interprets the subject code 17 in that block on an instruction-by-instruction basis in step 312. Control then returns to step 306 to analyze the next basic block of subject code. If the analyzed block contains instructions which are not covered by the interpreter 22 subset of instructions, the block of subject code 17 is marked as uninterpretable and is translated by translator 19 in step 302. In this manner, respective portions of the subject code 17 will either be interpreted or translated as appropriate for optimal performance.

Using this approach, the interpreter 22 will interpret the basic block of subject code 17 unless the basic block is marked as uninterpretable or its execution count has already reached the translation threshold, where the basic block will be translated in those instances. In some situations, the interpreter 22 will be running code and encounter a subject address in the subject code that has been marked as uninterpretable or has an execution counter that has reached the translation threshold (typically stored at branches), such that the translator 19 will translate the next basic block in these instances.

It should be noted that interpreter 22 creates no basic block objects in order to save memory, and execution counts are stored in cache rather than in basic block objects. Every time the interpreter 22 comes across a supported branch instruction, the interpreter 22 increments the counter associated with the address of the branch target.

The interpreter subset of instructions set may be determined in a variety of possible manners and may be variably selected based upon the performance tradeoff to obtain between interpreting and translating code. Preferably, the interpreter subset of instructions is obtained quantitatively prior to analyzing the subject code 17 by measuring the frequencies with which instructions are found across a set of selected program applications. While any program application may be selected, they are preferably carefully selected to comprise distinctly different types to cover a broad spectrum of instructions. For example, the applications may include Objective C applications (e.g., TextEdit, Safari), Carbon applications (e.g., the Office Suite), widely-used applications (e.g., Adobe, Macromedia), or any other types of program applications. An instruction subset is then selected that provides the highest basic block coverage across the selected applications, meaning that this instruction subset provides the highest number of complete basic blocks that can be interpreted using this instruction subset. While the instructions which entirely cover the largest number of basic blocks are not necessarily the same as the most frequently executed or translated instructions, but the resulting instruction subset will correspond roughly to the instructions that have been executed or translated most frequently. This interpreter subset of instructions is preferably stored in memory and called upon the interpreter 22.

By performing experimentation on a specific selected program application and also through the use of models, the inventors of the present invention found that the correlation between the most frequently translated instructions (out of a total of 115 instructions for the specifically tested application) and the number of basic blocks which would be interpretable using the most frequently translated instructions can be represented according to the following table:

| Instruction Set (of 115) | Interpretable blocks |
|---|---|
| 20 top translated | 70% |
| 30 top translated | 82% |
| 40 top translated | 90% |
| 50 top translated | 94% |

It can determined from these results that approximately 80-90% of the basic blocks of subject code 17 could be interpreted by the interpreter 22 using only the 30 most frequently translated instructions. Furthermore, blocks that have a lower execution count are given a higher priority for interpreting, since one of the advantages provided through the use of the interpreter 22 is to save memory. By selecting the 30 most frequently translated instructions, it was further found that 25% of the interpretable blocks were executed only once and 75% of the interpretable blocks were executed 50 or less times.

In order to estimate the savings provided by interpreting the most frequently translated instructions, using, by way of example only, an assumed cost of translating an 'average' basic block of 10 subject instructions of approximately 50 µs and executing one subject instruction in such a basic block taking 15 ns, the estimations contained in the following table illustrate about how well the interpreter 22 will have to perform in order to provide significant benefit based on using the 30 top translated instructions for the interpreter 22:

| Interpreter speed relative to translated speed | Max Translation Threshold | Proportion of blocks never translated |
|---|---|---|
| <10× slower | 300 executions | 74% |
| <20× slower | 150 executions | 71% |
| <30× slower | 100 executions | 68% |
| <60× slower | 50 executions | 62% |

The maximum translation threshold is set to equal the number of times the interpreter 22 can execute a block before the cost outweighs the cost of translating the block.

The particular interpreter subset of instructions selected from subject code instruction set can be variably adjusted according to desired operation of the interpreting and translating functions. Further, it is also important to include specialized pieces of subject code 17 in the interpreter 22 instruction subset which should be interpreted as opposed to being translated. One such specialized piece of subject code particularly required to be interpreted is called a trampoline, often used in OSX applications. Trampolines are small pieces of code which are dynamically generated at run-time. Trampolines are sometimes found in high-level language (HLL) and program-overlay implementations (e.g., on the Macintosh), that involve on-the-fly generation of small executable code objects to do indirection between code sections. Under BSD and possibly in other Unixes, trampoline code is used to transfer control from the kernel back to user mode when a signal (which has had a handler installed) is sent to a process. If trampolines are not interpreted, a partition must be created for each trampoline, resulting in exceedingly high memory usage.

By using an interpreter 22 capable of handling a certain percentage of the most frequently translated instructions (i.e., the top 30), the interpreter 22 was found to interpret around 80% of all basic blocks of subject code in the test programs. By setting the translation threshold to between 50 and 100 executions while preventing the interpreter from not being more than 20 times slower per block of subject instructions than a translated block, 60-70% of all basic blocks will never be translated. This provides a significant 30-40% savings in memory as a result of reduced target code 21 which is never generated. Latency may also improve by delaying work that might be unnecessary.

It should be noted that the above-described savings achieved by the interpreter 22 were based on experimental results obtained from particular uses of the interpreter 22. The various features of the interpreter 22, such as the particular interpreter subset of instructions selected from subject code instruction as well as the particular translation threshold selected, will be variably selected based upon the particular implementation of the interpreter 22 and the desired balance to achieve between the interpreting and translating functions. Furthermore, the particular interpreter subject of instructions may be selected as being capable of interpreting a specific target application program.

What is claimed:

1. A method of selectively interpreting or translating program code in a computing environment having a target processor and a memory coupled to the target processor, the program code comprising instructions from the instruction set of a subject processor, the method comprising:
    decoding said program code;
    applying an interpreting algorithm to identify whether said program code is interpretable by a simple interpreter, said simple interpreter incapable of interpreting a subset of instructions from the instruction set of the subject processor;
    if said program code contains only instructions in the subset such that the program code is interpretable by the simple interpreter, interpreting the program code using the simple interpreter; and
    translating said program code using a translator for non-interpretable subset of instructions when said program code is not interpreted.

2. The method of claim 1, wherein said program code comprises a basic block of program code.

3. The method of claim 1, wherein the step of applying a interpreting algorithm comprises determining whether instructions in said program code are included in a subset of instructions capable of being interpreted by the interpreter.

4. The method of claim 3, further comprising selecting the subset of instructions as a portion of an entire instruction set for the program code.

5. The method of claim 4, wherein the subset of instructions selecting step comprises selecting instructions from the entire instruction set which are executed most frequently across at least one program application.

6. The method of claim 4, wherein the selected subset of instructions is capable of interpreting a majority of the basic blocks of a specific target program application.

7. The method of claim 4, wherein the subset of instructions is selected to interpret a specific target program application.

8. The method of claim 1, wherein the step of applying an interpreting algorithm to identify whether the program code is interpretable further comprises determining whether an execution count of the program code is below a translation threshold,
    wherein the program code is translated by the translator if the execution count of the program code is greater than or equal to the translation threshold.

9. The method of claim 2, wherein the step of applying an interpreting algorithm to identify whether the basic block of program code is interpretable further comprises determining whether an execution count of the basic block of program code is below a translation threshold,
    wherein the basic block of program code is translated by the translator if the execution count of the basic block of program code is greater than or equal to the translation threshold.

10. A computer-readable storage medium having software resident thereon in the form of computer-readable code executable by a target computer to perform the following steps during selective interpretation or translation of program code comprising instructions from an instruction set of a subject processor:
    decoding said program code;
    applying an interpreting algorithm to identify whether said program code is interpretable by a simple interpreter, said simple interpreter incapable of interpreting a subset of instructions from the instruction set of the subject processor;
    if said program code contains only instructions from the subset such that the program code is interpretable by the simple interpreter, interpreting the program code using the simple interpreter; and
    translating said program code using a translator for non-interpretable subset of instructions when said program code is not interpreted.

11. The computer-readable storage medium of claim 10, wherein said program code comprises a basic block of program code.

12. The computer-readable storage medium of claim 10, wherein the step of applying a interpreting algorithm comprises determining whether instructions in said program code are included in a subset of instructions capable of being interpreted by the interpreter.

13. The computer-readable storage medium of claim 12, said computer-readable code further executable for selecting the subset of instructions as a portion of an entire instruction set for the program code.

14. The computer-readable storage medium of claim 13, wherein the subset of instructions selecting step comprises selecting instructions from the entire instruction set which are executed most frequently across at least one program application.

15. The computer-readable storage medium of claim 13, wherein the selected subset of instructions is capable of interpreting a majority of the basic blocks of a specific target program application.

16. The computer-readable storage medium of claim 13, wherein the subset of instructions is selected to interpret a specific target program application.

17. The computer-readable storage medium of claim 10, wherein the step of applying an interpreting algorithm to identify whether the program code is interpretable further comprises determining whether an execution count of the program code is below a translation threshold, wherein the program code is translated by the translator if the execution count of the program code is greater than or equal to the translation threshold.

18. A translator/interpreter apparatus for use in a computing environment having a target processor and a memory coupled to the target processor for either translating or interpreting program code from an instruction set of a subject processor, said translator/interpreter apparatus comprising:

a decoding mechanism configured to decode said program code;

an interpreter incapable of interpreting a subset of instructions from the instruction set of the subject processor, and comprising an interpreter mechanism, wherein the interpreter mechanism is configured to apply an interpreting algorithm to identify whether said decoded program code contains only instructions from the subset of instructions which the interpreter is capable of interpreting, and, if said program code contains only such instructions, interpreting the program code using the interpreter; and a translator mechanism configured to translate said decoded program code using a translator for non-interpretable subset of instructions when said program code is not interpreted.

19. The translator/interpreter apparatus of claim 18, wherein said program code comprises a basic block of program code.

20. The translator/interpreter apparatus of claim 18, wherein the interpreter mechanism is further configured to determine whether instructions in said program code are included in a subset of instructions capable of being interpreted by the interpreter.

21. The translator/interpreter apparatus of claim 20, further comprising an instruction selecting mechanism for selecting the subset of instructions as a portion of an entire instruction set for the program code.

22. The translator/interpreter apparatus of claim 21, wherein the instruction selecting mechanism is further configured for selecting instructions from the entire instruction set which are executed most frequently across at least one program application.

23. The translator/interpreter apparatus of claim 21, wherein the selected subset of instructions is capable of interpreting a majority of the basic blocks of a specific target program application.

24. The translator/interpreter apparatus of claim 21, wherein the subset of instructions is selected to interpret a specific target program application.

25. The translator/interpreter apparatus of claim 18, wherein the interpreter mechanism is further configured to determine whether an execution count of the program code is below a translation threshold, wherein the program code is translated by the translator mechanism if the execution count of the program code is greater than or equal to the translation threshold.

* * * * *